(12) United States Patent
Kado et al.

(10) Patent No.: US 8,267,073 B2
(45) Date of Patent: Sep. 18, 2012

(54) AIR INTAKE APPARATUS FOR INTERNAL COMBUSTION ENGINE

(75) Inventors: Hiroyuki Kado, Kariya (JP); Toshio Hayashi, Obu (JP); Hiroyoshi Murakami, Obu (JP); Yasushi Kawano, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/137,881

(22) Filed: Sep. 20, 2011

(65) Prior Publication Data

US 2012/0012082 A1    Jan. 19, 2012

Related U.S. Application Data

(62) Division of application No. 12/272,071, filed on Nov. 17, 2008, now Pat. No. 8,051,845.

(30) Foreign Application Priority Data

Nov. 19, 2007    (JP) .................................. 2007-299732

(51) Int. Cl.
*F01M 13/00*    (2006.01)
(52) U.S. Cl. .................................. 123/572; 123/184.21
(58) Field of Classification Search .......... 123/572–574, 123/184.21–184.61, 41.86
See application file for complete search history.

(56) References Cited

U.S. PATENT DOCUMENTS

| | | | |
|---|---|---|---|
| 3,172,399 A | | 3/1965 | Lentz et al. |
| 3,742,923 A | * | 7/1973 | Oblander et al. ............. 123/572 |
| 4,768,493 A | | 9/1988 | Ohtaka et al. |
| 4,840,152 A | * | 6/1989 | Watanabe et al. ........... 123/41.08 |
| 6,729,316 B1 | * | 5/2004 | Knowles ........................ 123/572 |
| 7,543,573 B2 | | 6/2009 | Olree |
| 7,900,612 B2 | | 3/2011 | Knaus et al. |
| 8,205,604 B2 | * | 6/2012 | Velosa et al. .................. 123/572 |
| 2002/0002968 A1 | * | 1/2002 | Gillespie ........................ 123/572 |
| 2009/0126670 A1 | | 5/2009 | Kado et al. |

FOREIGN PATENT DOCUMENTS

| | | |
|---|---|---|
| JP | 52-001928 | 1/1977 |
| JP | 10-331621 | 12/1998 |
| JP | 2001-20814 | 1/2001 |
| JP | 2003-120245 | 4/2003 |
| JP | 2004-60488 | 2/2004 |

OTHER PUBLICATIONS

Japanese Office Action dated Sep. 15, 2009, issued in corresponding Japanese Application No. 2007-299732, with English translation.
Chinese Office Action dated Apr. 13, 2010, issued in corresponding Chinese Application No. 200810175411.9, with English translation.

\* cited by examiner

*Primary Examiner* — M. McMahon
(74) *Attorney, Agent, or Firm* — Nixon & Vanderhye PC

(57) ABSTRACT

A housing has an intake passage extending substantially in a vertical direction of a vehicle. A valve is configured to open and close the intake passage. A shaft supports the valve. A bearing supports the shaft. A hose is connected with an upper side of the housing in the vertical direction and configured to lead intake air into the intake passage. A communication passage configured to communicate an inside of an internal combustion engine of the vehicle with the hose. The communication passage has an opening in the vicinity of a point directly above the bearing. The hose has a wall surface defining a condensate passage, which connects the opening with a target location from which condensate is to be dropped.

9 Claims, 21 Drawing Sheets

AIR INTAKE APPARATUS FOR INTERNAL COMBUSTION ENGINE

CROSS REFERENCE TO RELATED APPLICATIONS

This application is a division of application Ser. No. 12/272,071, filed Nov. 17, 2008, which is in turn based on Japanese Patent Application No. 2007-299732 filed on Nov. 19, 2007, the disclosures of each of which are incorporated herein by reference.

FIELD OF THE INVENTION

The present invention relates to an air intake apparatus for an internal combustion engine.

BACKGROUND OF THE INVENTION

Conventionally, a vehicle such as an automobile is provided with a positive crankcase ventilation device (PCV device) as a blow-by gas reduction device. The PCV device is configured to return blow-by gas (PCV gas) to an air intake system without emitting the PCV gas to the atmosphere, thereby burning the PCV gas in the engine. The blow-by gas (PCV gas) is discharged through a gap between a piston and a cylinder of an internal combustion engine and emitted from a crankcase. The PCV gas flowing into a crank chamber of the crankcase contains moisture. When engine oil (lubricating oil) in the crank chamber is contaminated with the moisture of PCV gas, the engine oil may be deteriorated. In addition, moisture contained in engine oil and PCV gas may evaporate due to increase in temperature of engine oil accompanied by engine operation. Consequently, pressure in the crank chamber may increase. Thus, operation of the piston may be disturbed.

The PCV device is configured to draw blow-by gas, which is caused in the crankcase, and return the blow-by gas into the intake system, thereby burning the returned blow-by gas in the engine. In addition, the PCV device is further configured to lead pure fresh air, which is filtered by the air cleaner and removed of impurities, into the crankcase, thereby ventilating the crankcase. The PCV device is, in general, configured to return PCV gas to both an intake passage upstream of an throttle valve of an electronic throttle device and an intake passage downstream of the throttle valve so as not draw engine oil. More specifically, the PCV device is, for example, configured to return PCV gas to both an intake passage defined in an air cleaner hose (air hose) and an intake passage in the surge tank or an intake manifold. The air cleaner hose connects the air cleaner with the throttle body.

Generally, PCV gas returned to the intake passage upstream of the throttle valve contains a large amount of moisture or steam. Accordingly, when a PCV hose, a union pipe, or the air hose is cooled, moisture in PCV gas may condense to be condensate. Such condensate drips from an opening of a PCV port into the throttle body, which is located downward in the gravity direction. The condensate may infiltrates into a gap between a shaft and a bearing, and consequently the condensate may cause freezing (icing).

SUMMARY OF THE INVENTION

In view of the foregoing and other problems, it is an object of the present invention to produce an air intake apparatus for an internal combustion engine, the air intake apparatus configured to restrict infiltration of condensate into a movable portion around a bearing and a shaft of a valve.

As follows, an electronic throttle device according to a related art will be described with reference to FIGS. 15 to 18. An air hose 103 is connected to an upstream end of a throttle body 102 of an electronic throttle device 101. The air hose 103 is integrally formed with a fresh air introduction port (PCV port) 106. The PCV port 106 communicates with a crank chamber with an intake passage 111 through a PCV hose and a union pipe 104. The crank chamber is located inside of a crankcase of an engine. The intake passage 111 is located upstream of a throttle valve 105 in the air hose 103. The vehicle is further provided with the electronic throttle device 101 having the throttle valve 105, which is configured to open and close an engine intake pipe (throttle bore) so as to control intake air drawn into a combustion chamber of the engine. The electronic throttle device 101 includes the throttle body 102, the butterfly-type throttle valve 105, a shaft 107, a motor, and the like. The throttle body 102 is equipped with a pair of bearings 109, which slidably supports both axial ends of the shaft 107. The shaft 107 and the bearings 109 therebetween define a predetermined gap (slidable clearance), thereby the shaft 107 smoothly is rotatable inside the bearing 109. The shaft 107 is rotatable around a center axis shown by the dotted line in FIG. 17.

Generally, PCV gas returned to the intake passage 111 upstream of the throttle valve 105 contains a large amount of moisture or steam. Accordingly, when the PCV hose, the union pipe 104, or the air hose 103 is cooled, moisture in PCV gas may condense. Consequently, the moisture becomes condensate in the PCV hose, the union pipe 104, and the PCV port 106. Such condensate drips from an opening 110 of the PCV port 106 into the throttle body 102, which is located downward in the gravity direction. The condensate may drip to the axial end of the shaft 107 at the side of the bearing 109 and may infiltrate into the gap between the shaft 107 and the bearing 109. Consequently, the condensate may diffuse throughout the gap by the capillary phenomenon. Thereafter, when the engine is stopped and ambient temperature becomes below the freezing point, the condensate infiltrated into the gap between the shaft 107 and the bearing 109 may freeze. In this case, icing arises at the throttle valve 105 and the shaft 107, and consequently the throttle valve 105 and the shaft 107 therebetween cause seizure due to the icing. As a result, the throttle valve 105 may cause a failure (malfunction) such as shaft lock when the engine is again started. Accordingly, it is an object to restrict seizure and shaft lock of the throttle valve 105 caused by icing.

In view of the foregoing problems, so as to avoid icing, it is conceived to separate the PCV port 106 from the electronic throttle device 101 or to provide the PCV port 106 in the vicinity of a warm water heating unit, which is configured to heat the throttle body 102 of the electronic throttle device 101. However, the PCV port 106 may not be arranged apart from the electronic throttle device 101 or may not be arranged in the vicinity of the warm water heating unit, because of constraints of layout of component in the vehicle. In particular, when the electronic throttle device 101 has a downdraft structure in which the intake passage extends in the vertical direction of the vehicle, it is difficult to specifically identify a path of condensate from the intake passage 111 and the PCV port 106. The vertical direction of the vehicle may substantially coincide with the dashed line shown in FIGS. 16, 18.

Furthermore, mounting of the electronic throttle device 101 is subjected with constraints caused by commonality and downsizing of the engine. Accordingly, the location of the PCV port, through which PCV gas returns, is further subjected with constraints. In addition, the electronic throttle devices 101 having the downdraft structure is further employed so as to achieve a compact layout. In such a downdraft structure, condensate freely falls from the opening 110 of the PCV port 106, and hence the path of condensate cannot be specifically identified. Accordingly, icing may arise in the gap between the shaft 107 and the bearing 109 due to infiltration of condensate, which drips and falls from the opening 110 of the PCV port 106.

As shown in FIG. 19, in the electronic throttle device 101 having the downdraft structure, the opening 110 of the PCV port 106 is located at the directly upper side of the bearing 109, because of constraint of layout in the vehicle. In the present structure, condensate, which drips from the opening 110 of the PCV port 106, may directly falls onto the bearing 109 of the shaft 107. Consequently, the condensate may infiltrate into the gap between the shaft 107 and the bearing 109. In this case, icing may arise on the shaft 107, and shaft lock may occur.

Therefore, in the electronic throttle device 101 having the downloading structure, it is conceived to determine the distance between the opening 110 of the PCV port 106 and the bearing 109 to be equal to or greater than 150 mm so as to avoid the direct fall of condensate to the bearing 109. Preferably, the opening 110 of the PCV port 106 is provided in the air cleaner. However, when the opening 110 of the PCV port 106 cannot be provided in the air cleaner, as shown in FIG. 20, the opening 110 of the PCV port 106 may be shifted by 90° from the gap between the shaft 107 and the bearing 109 in the direction of the inner circumferential periphery of the air hose 103. Further, the opening 110 of the PCV port 106 is located on an axis, which passes through a point of a semicircle plate portion of the throttle valve 105. The point of the semicircle plate portion of the throttle valve 105 is most distant from the shaft 107 and at the lower side in the gravity direction relative to the center axis of the shaft 107 when the throttle valve 105 is in a full close position. In the present structure of the electronic throttle device 101 having the downdraft structure, condensate can be restricted from falling onto the gap between the shaft 107 and the bearing 109. However, the arrangement of the PCV port 106 shown in FIG. 20 becomes increasingly difficult because of constraints of mounting of component in the vehicle.

For example, as shown in FIG. 21, JP-A-2003-120245 proposes an air intake apparatus having a downdraft structure. In the present structure of JP-A-2003-120245, the air hose 103 connects the air cleaner with the throttle body 102, and the air hose 103 is provided with the PCV port 106 having an opening 112 upstream of the throttle valve 105 in the intake passage 111. The hose wall surface of the air hose 103 defines an annular step 113 between the opening 112 of the PCV port 106 and the throttle valve 105 in the throttle body 102. The annular step 113 is inclined with respect to the inner circumferential periphery of the air hose 103. In the present structure of JP-A-2003-120245, condensate is led to a portion of the throttle valve 105, which moves downward when the throttle valve 105 opens, and whereby the condensate can be restricted from directly falling onto the bearing 109.

However, in the present air intake apparatus having the downdraft structure of JP-A-2003-120245, condensate is increased in momentum when falling from the opening 112 of the PCV port 106, and the condensate may overcome the annular step 113. Consequently, the condensate may freely fall after passing over the annular step 113. In this case, the condensate cannot be led to the predetermined location, and consequently, the bearing 109 cannot be steadily protected from direct fall of the condensate.

According to one aspect of the present invention, an air intake apparatus for an internal combustion engine, the air intake apparatus comprises a housing having an intake passage extending substantially in a vertical direction of a vehicle. The air intake apparatus further comprises a valve configured to open and close the intake passage. The air intake apparatus further comprises a shaft supporting the valve. The air intake apparatus further comprises a bearing supporting the shaft. The air intake apparatus further comprises a hose connected with an upper side of the housing in the vertical direction and configured to lead intake air into the intake passage. The air intake apparatus further comprises a communication passage configured to communicate an inside of the internal combustion engine with the hose. The communication passage has an opening in the vicinity of a first point directly above the bearing. The hose has a wall surface defining a condensate passage, which connects the opening with a target location from which condensate is to be dropped.

According to another aspect of the present invention, an air intake apparatus for an internal combustion engine, the air intake apparatus comprises a housing having an intake passage extending substantially in a vertical direction of a vehicle. The air intake apparatus further comprises a valve configured to open and close the intake passage. The air intake apparatus further comprises a shaft supporting the valve. The air intake apparatus further comprises a bearing supporting the shaft. The air intake apparatus further comprises a hose connected with an upper side of the housing in the vertical direction and configured to lead intake air into the intake passage. The air intake apparatus further comprises a communication passage configured to communicate an inside of the internal combustion engine with the hose. The communication passage has an opening in the vicinity of a first point directly above the bearing. The opening has a lowest point in a gravity direction. The lowest point is away from an area in the vicinity of the first point.

According to another aspect of the present invention, an air intake apparatus for an internal combustion engine, the air intake apparatus comprises a housing having an intake passage extending substantially in a vertical direction of a vehicle. The air intake apparatus further comprises a valve configured to open and close the intake passage. The air intake apparatus further comprises a shaft supporting the valve. The air intake apparatus further comprises a bearing supporting the shaft. The air intake apparatus further comprises a hose connected with an upper side of the housing in the vertical direction and configured to lead intake air into the intake passage. The air intake apparatus further comprises a communication passage configured to communicate an inside of the internal combustion engine with the hose. The communication passage has an opening in the vicinity of a first point directly above the bearing. The hose has a partition portion. The partition portion and a wall surface therebetween define a pocket, which has a condensate passage and a drain hole. The condensate passage connects the opening with a target location, from which condensate is to be dropped. The drain hole opens at the target location.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Construction of First Embodiment

Figure 1:
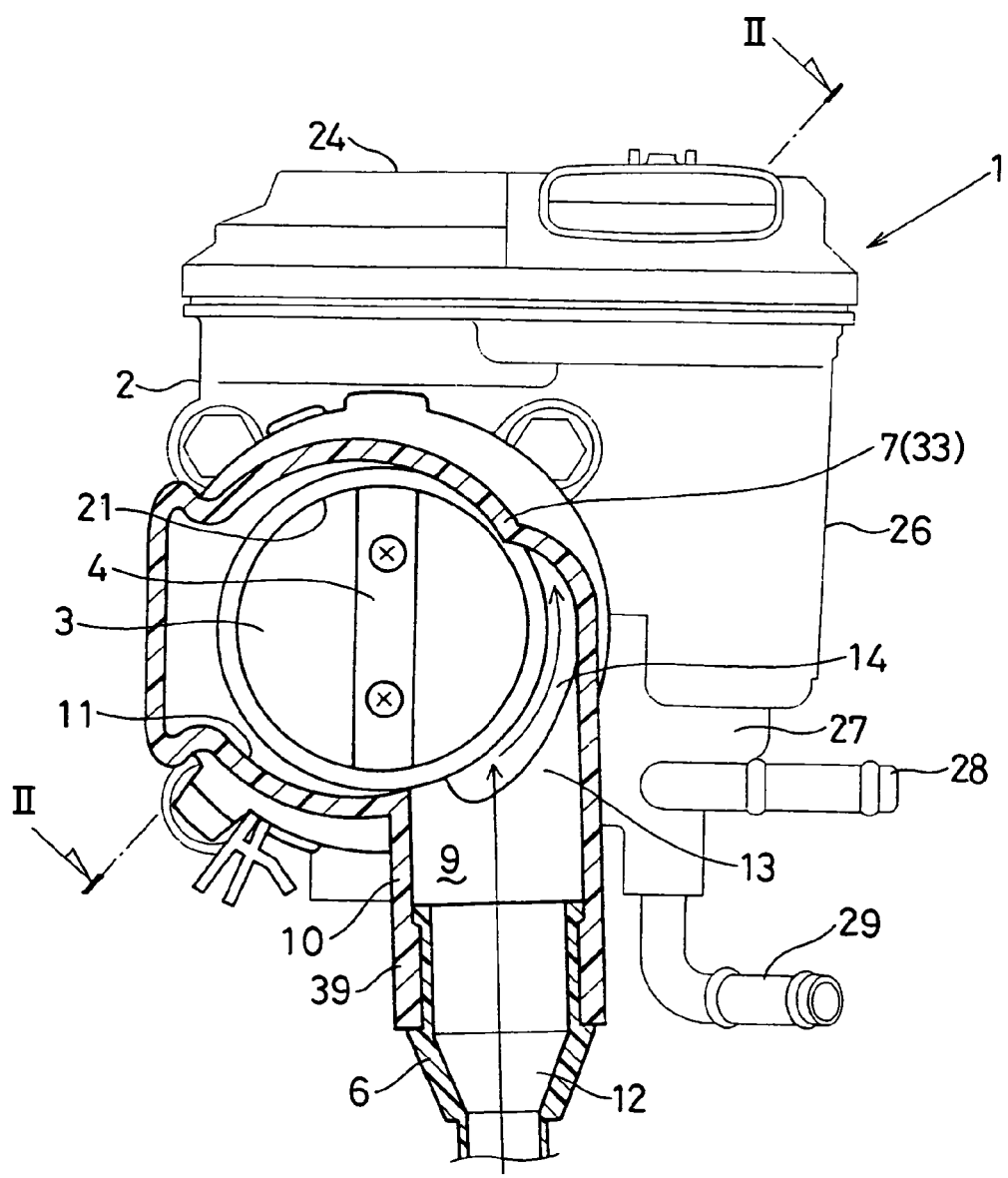
FIG. 1 is a partially sectional view showing an electronic throttle device equipped with an air cleaner hose, according to a first embodiment.
Figure 2:
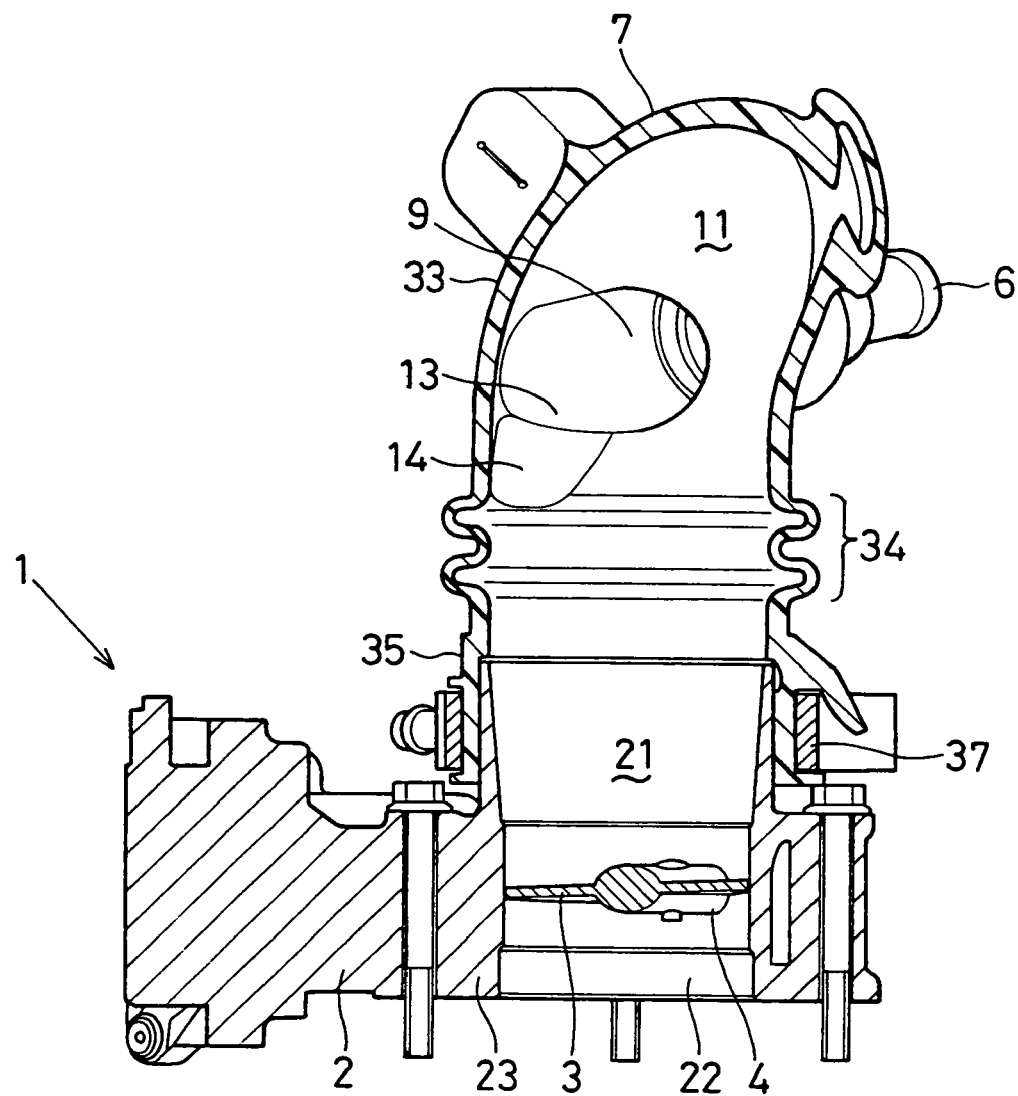
FIG. 2 is a sectional view taken along with the line II-II in FIG. 1, according to the first embodiment.
Figure 3:
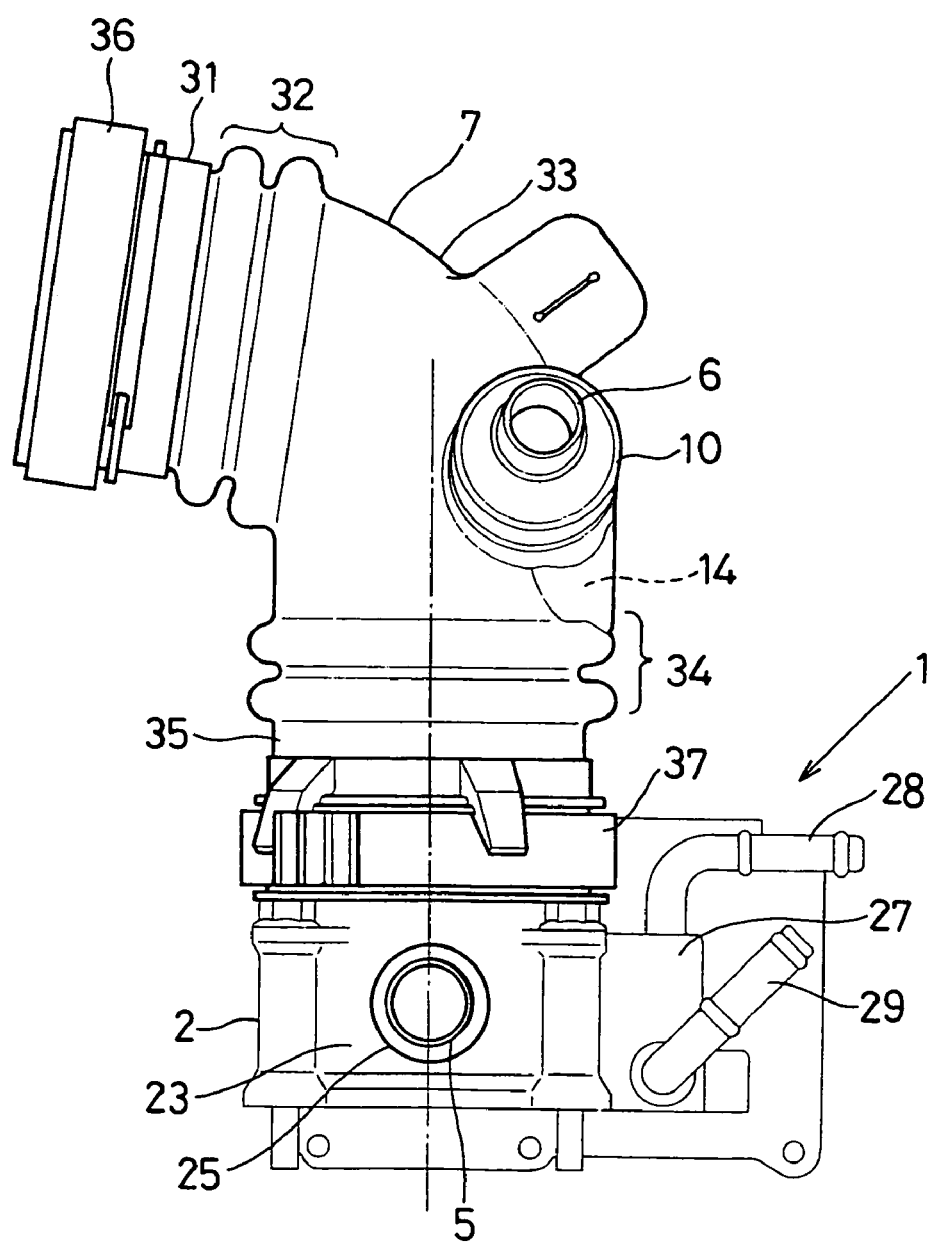
FIG. 3 is a lateral view showing the electronic throttle device equipped with the air cleaner hose, according to the first embodiment.
Figure 4:
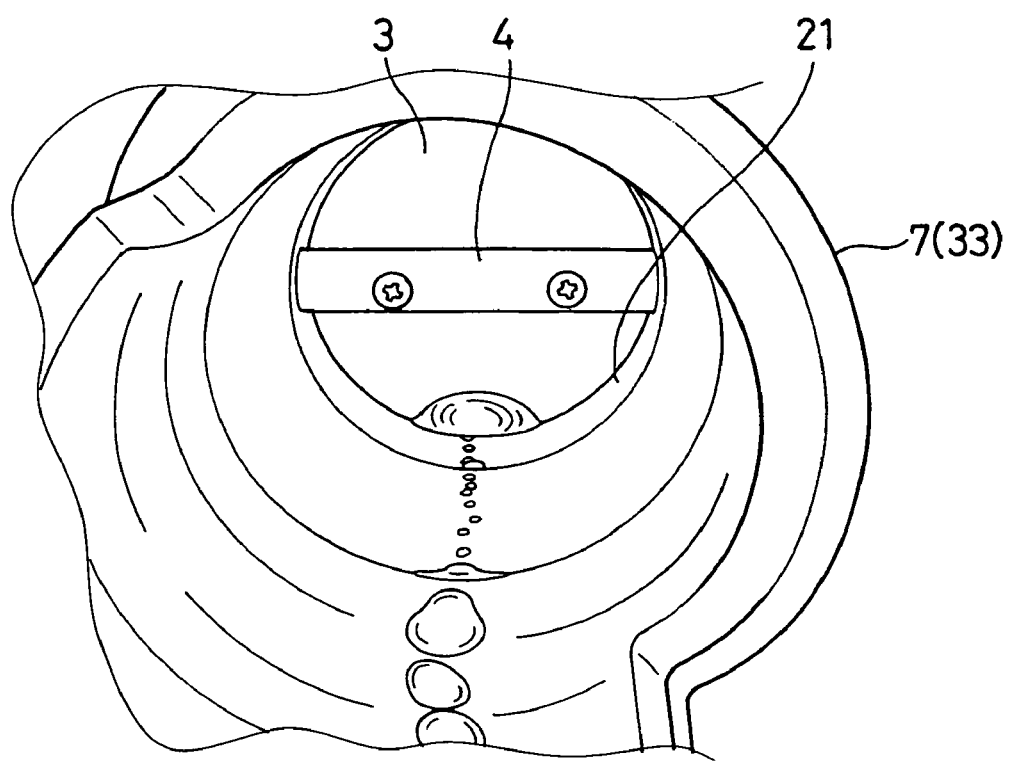
FIG. 4 is an explanatory view showing a state where a bearing is protected from direct fall of condensate, according to the first embodiment.

The present first embodiment will be described with reference to FIGS. 1 to 4. FIGS. 1 to 3 depict an electronic throttle device equipped with an air cleaner hose. According to the present embodiment, an internal combustion engine is mounted with an electronic throttle device 1, a blow-by gas reduction device, and the like. The electronic throttle device 1 is provided with an air cleaner and a downdraft. The engine is, for example, mounted in an engine room of an automobile. In the present embodiment, the engine is, for example, a water-cooled gasoline engine, which is configured to obtain engine power as thermal energy produced by burning fuel-air mixture in a combustion chamber. The fuel-air mixture contains intake air, which is filtered by an air cleaner of the engine, and fuel injected from an injector. The engine power is, for example, output shaft torque as engine torque.

The engine further includes an engine cooling device, which has a cooling-water circuit through which cooling water is circulated. The engine cooling device includes a cooling-water circulation path (cooling-water circuit) through which cooling water is circulated for cooling a main body of the engine. The main body of the engine includes a cylinder head, a cylinder block, and the like. The cooling-water circuit includes a radiator, a thermostat, a water pump, a warm water heating unit of a throttle body 2, and the like. The engine is, for example, a water-cooled gasoline engine, which is cooled and controlled at proper temperature by forcedly circulating cooling water through a water jacket of an interior of the engine. Thus, components of the engine are efficiently operable. The engine includes an intake duct (intake pipe) for supplying intake air into each combustion chamber of each cylinder of the engine. The engine further includes an exhaust duct (exhaust pipe) to discharge exhaust gas from each combustion chamber to the outside through a purification device. The air intake duct therein defines an intake passage for leading fresh air as clean air into the throttle body 2 of the electronic throttle device 1 through an air cleaner hose (air hose) 7. The fresh air is filtered through the air cleaner. The air intake duct includes an air cleaner case, the air cleaner hose 7 of the throttle body 2, a surge tank, an intake manifold, and the like.

The main body of the engine includes the cylinder head, the cylinder block, an oil sump, and the like. One side of the cylinder head defines an intake port, which is opened and closed by a poppet-type intake valve. The other side of the cylinder head defines an exhaust port (not shown) opened and closed by a poppet-type exhaust valve. The cylinder head is provided with sparkplugs each having a tip end being exposed to the combustion chamber of each cylinder. The cylinder head is provided with injectors (electromagnetic fuel injection valves) each configured to inject fuel into an intake port at an optimum timing. The cylinder block therein defines cylinder bores each accommodating a piston. The piston is connected with a crankshaft via a connecting bar and movable in the vertical direction. The cylinder head and the cylinder block, for example, therein define a water jacket, which surrounds the circumference of the cylinder bore. A crankcase is integrally formed with a lower side of the cylinder block so as to airtightly define the oil sump. The crankcase therein defines a crank chamber. The air cleaner includes a filtration element (filter element) provided uppermost stream in the air intake duct of the engine. The filter element is configured to capture and remove impurities (foreign matters) such as dust and sand contained in fresh air. The air cleaner hose 7 as an intake pipe connects an air cleaner with the throttle body 2. The air cleaner hose 7 therein defines an intake passage 11 located upstream of a throttle valve 3. The air cleaner hose 7 will be described later in detail.

According to the present embodiment, the electronic throttle device 1 includes the throttle body (housing) 2, a shaft 4, an actuator, and an engine control unit (ECU). The throttle body 2 is airtightly joined with, in particular, a downstream end of the air cleaner hose 7 midway through the air intake duct of the engine. The shaft 4 is fixed to the throttle valve (butterfly valve) 3 so as to support the throttle valve 3 for opening and closing a throttle bore 21, 22 as an inner passage of the throttle body 2. The actuator as a valve actuating device includes a motor for actuating the throttle valve 3. The engine control unit (ECU) is configured to supply electric power to a coil of the motor according to engine operating condition so as to control a throttle position, which corresponds to an angle of the throttle valve 3, in relation to systems such as an igniter and a fuel injection device.

The electronic throttle device 1 functions as an air intake apparatus for the engine. The electronic throttle device 1 is configured to actuate the motor according to manipulation of an accelerator pedal by a driver so as to manipulate the throttle position of the throttle valve 3. Whereby, the electronic throttle device 1 controls the flow of intake air, i.e., an amount of intake air supplied to the combustion chamber of each engine cylinder, thereby controlling engine speed and engine output shaft torque. The manipulation of the accelerator corresponds to stepping of the accelerator pedal by the driver. The electronic throttle device 1 further includes a return spring and a pair of bearings 5, in addition to the throttle body 2 and the throttle valve 3. The return spring biases the throttle valve 3 in a closing direction so as to return the throttle valve 3 to a full close position. The pair of bearings 5 supports both ends of the shaft 4 such that the shaft 4 is slidable in a rotative direction. In the present embodiment, a coil spring is employed as the return spring. A slide bearing is employed as the first bearing 5. A slide bearing, a roller bearing, or a ball bearing is employed as the second bearing 5. The shaft 4 is rotatable around the center axis shown by the dotted line shown in FIG. 5.

According to the present embodiment, the throttle body 2 is, for example, formed of aluminum die-casting alloy in a predetermined shape. The throttle body 2 is a housing, which therein holds the throttle valve 3. The throttle valve 3 is rotatable from the full close position to a full open position. The throttle body 2 is screwed to an intake manifold of the engine using a bolt or the like. In the present embodiment, intake air is filtered through the air cleaner, and the intake air flows from the an inlet portion of the throttle body 2 into the throttle bore 21, 22, after passing through the intake passage 11 of the air cleaner hose 7. The intake air is drawn into the intake port of each engine cylinder of each combustion chamber after passing through an intake manifold, which is connected to an outlet portion of the throttle body 2. The inlet portion of the throttle body 2 opens at an upper end in the gravity direction, and the outlet portion of the throttle body 2 opens at a lower end in the gravity direction. The throttle body 2 has a cylinder portion (throttle bore wall) 23, which therein defines the throttle bore 21, 22 substantially in a circular shape in cross section. The throttle body 2, in particular, the cylinder portion 23 is integrally formed of a metallic material to be in a predetermined circular pipe shape, for example. The cylinder portion 23 has an axial end in the axial direction thereof, and the axial end is equipped with a sensor cover 24.

The sensor cover 24 is configured to support a throttle position sensor. The sensor cover 24 is, for example, formed of a resin material.

The cylinder portion 23 has a downflow-type throttle bore (intake passage) 21, 22 extending in the vertical direction of the automobile. The throttle bore 21, 22 extends substantially straight from an inlet portion of the throttle body 2 toward an outlet portion of the throttle body 2. The throttle bore 21, 22 extends in the axial direction substantially along both a passage direction of the cylinder portion 23 and the vertical direction of the automobile. That is, the throttle bore 21, 22 extends substantially perpendicularly to both the rotation center axis of the throttle valve 3 and the center axis of the shaft 4. The vertical direction of the vehicle may substantially coincide with the dashed line shown in FIG. 3. The throttle bore 21 is provided at the upper side in the gravity direction of the throttle body 2, as an intake passage upstream of the throttle valve 3. The throttle bore 22 is provided at the lower side in the gravity direction of the throttle body 2, as an intake passage downstream of the throttle valve 3. The cylinder portion 23 of the throttle body 2 is provided with the pair of shaft bearings 25, which are opposed to each other via the throttle bore 21, 22. Each of the first and second shaft bearings 25 therein defines a shaft accommodating bore, which is substantially in a circular shape in cross section. The shaft accommodating bore extends along both the center axis of the throttle valve 3 and the center axis of the shaft 4 in a shaft direction.

One of the shaft bearings 25 is provided to one end of the shaft 4. The one of the shaft bearings 25 has the inner circumferential periphery (accommodating bore wall surface) defining the shaft accommodating bore. The accommodating bore wall surface of the one of the shaft bearings 25 is fitted with the first bearing 5 such as a slide bearing, which rotatably supports the one end of the shaft bearings 25. The other of the shaft bearings 25 is provided to other end of the shaft 4. The other of the shaft bearings 25 has the inner circumferential periphery (accommodating bore wall surface) defining the shaft accommodating bore. The accommodating bore wall surface of the other of the shaft bearings 25 is fitted with the second bearing 5 such as a slide bearing, which rotatably supports the other end of the shaft bearings 25. In the present structure, the pair of shaft bearings 25 slidably supports the shaft 4 in the rotative direction via the pair of bearings 5. The cylinder portion 23 of the throttle body 2 has a wall portion, which is integrally formed with a motor housing 26 for accommodating a motor. The electronic throttle device 1 has a block 27, which is substantially in a rectangular parallelepiped shape and projected from the cylinder portion 23 outward in the radial direction. The block 27 accommodates a warm water heating unit (warm water passage), which is configured to therethrough lead fluid such as warm water or hot water into the cylinder portion 23 of the throttle body 2 when being used under a cold environment such as winter so as to restrict freezing (icing) of the throttle valve 3. The fluid may be engine cooling water. The block 27 is connected with an inlet pipe 28 for leading warm water into the warm water heating unit and an outlet pipe 29 for leading warm water out of the warm water heating unit. The inlet pipe 28 and the outlet pipe 29 are connected with the cooling-water circulation path (cooling-water circuit) of the engine cooling device.

In the present embodiment, the throttle valve 3 is provided in the throttle bore 21, 22 communicated with the combustion chambers and the intake ports of all the cylinders of the engine. The throttle valve 3 is configured to open and close the throttle bore 21, 22. The throttle valve 3 is accommodated inside the cylinder portion 23 of the throttle body 2 (throttle bore 21, 22) and configured to open and close the interior of the cylinder portion 23. The throttle valve 3 is a rotary-type intake-air-control valve, which is rotatable relative to the cylinder portion 23 of the throttle body 2. More specifically, the throttle valve 3 is a disc-shaped butterfly valve, which is rotatable around the center axis of the shaft 4 so as to open and close the throttle bore 21, 22. The throttle valve 3 is rotated, i.e., changed in rotation angle within a valve operation range between the full close position and the full open position based on a control signal from the ECU while the engine operates. The throttle valve 3 is configured to manipulate an opening area as an intake air passage area of the throttle bore 21, 22 so as to control the flow of intake air. The throttle valve 3 is, for example, returned to the full close position by being exerted with biasing force of the return spring or the like when supply of the electric power to the motor is stopped in response to engine shutdown. Alternatively, in the present condition, the throttle valve 3 may be operated at a middle lift (intermediate position) where the throttle valve 3 is slightly opened from the full close position.

The throttle valve 3 has a disc-shaped portion, which radially extends outward in the radial direction from an intersection between the center axis of the cylinder portion 23, which extends in the passage direction of the cylinder portion 23 of the throttle body 2, and the center axis of the shaft 4. When the throttle valve 3 is in the full close position, the back face and the front face of the disc-shaped portion of the throttle valve 3 is slightly inclined relative to an imaginary line, which is perpendicular to the passage direction of the cylinder portion 23 of the throttle body 2 by a predetermined rotation angle in the opening direction. That is, the throttle valve 3 is slightly inclined relative to an imaginary line, which is perpendicular to the axial direction of the throttle bore 21, 22 when being in the full close position.

According to the present embodiment, the passage direction of the cylinder portion 23 of the throttle body 2 is equivalent to the axial direction of the throttle bore 21, 22, and the passage direction of the cylinder portion 23 substantially corresponds to the top to bottom direction (vertical direction) when the electronic throttle device 1 is mounted to the automobile. That is, the passage direction of the cylinder portion 23 substantially corresponds to the vertical direction of the automobile, i.e., the vertical direction with respect to the gravity direction. The disc-shaped portion of the throttle valve 3 is inserted into a valve insertion hole of the shaft 4, and the disc-shaped portion is screwed and fixed to the shaft 4 using a screw or the like. The disc-shaped portion of the throttle valve 3 includes two semicircle plate-like portions as first and second disk portions, which are segmented by the shaft 4. In the present embodiment, the second disc portion is located at the lower side of both the first disc portion and the shaft 4 with respect to the gravity direction when the throttle valve 3 is in the full close position.

The shaft 4 substantially extends straight in the axial direction thereof. The shaft 4 has a center portion as a valve holding portion, which is integrated with the throttle valve 3. The valve holding portion has the valve insertion hole, which therethrough extends in the radial direction of the valve holding portion. The shaft 4 is connected with and driven by the output shaft of the motor via an output power transmission mechanism. The shaft 4 has both the axial ends in the axial direction, and both the axial ends respectively have two sliding portions (sliding surface), which are respectively supported rotatably by the pair of shaft bearings 25 and the bearing 5 provided to the cylinder portion 23 of the throttle body 2.

The actuator is an electromotive actuator configured to actuate the shaft 4 of the throttle valve 3 in the opening direction and the closing direction. The actuator includes the motor, which is configured to generate driving force when being supplied with electric power, and the output power transmission mechanism, which is for transmitting the rotary motion of an output shaft of the motor to the shaft 4. The output power transmission mechanism includes a reduction gear mechanism, which is configured to increase driving force (motor torque) of the motor and reduce the rotation speed of the motor at a predetermined moderating ratio. The reduction gear mechanism includes a pinion gear, an intermediate reduction gear, a final reduction gear, and the like. The pinion gear as a motor gear is fixed to the output shaft of the motor. The intermediate reduction gear meshes with the motor gear thereby rotated by the motor gear. The final reduction gear meshes with the intermediate reduction gear thereby rotated by the intermediate reduction gear. The output shaft of the motor may be directly coupled with the shaft 4.

The motor is electrically connected with a battery of the automobile via a motor drive circuit, which is electronically controlled by the ECU. For example, the motor is configured to generate driving force to actuate the shaft 4 of the throttle valve 3 when a coil of a rotor of the motor is supplied with electric power. The ECU controls energization of the motor so as to control the motor. The ECU has a microcomputer including a CPU, a storage unit, an input circuit, an output circuit, a power supply circuit, a timer, and the like. The CPU executes control processings and arithmetic processings. The storage unit is a memory such as a ROM and a RAM that stores control programs and control logics. The ECU may be a generally known microcomputer.

The ECU is configured to execute the control programs and control logics stored in the memory of the microcomputer so as to control energization of the coil of the motor to manipulate the shaft 4 of the throttle valve 3 of the electronic throttle device 1 when an ignition switch (not shown) is turned on (IG-ON). Further, the ECU is configured to manipulate ignition devices, such as an ignition coil and a sparkplug, and fuel injection devices such as an electric fuel pump and an injector. In the present structure, control command values as control target values of the throttle position, which is relevant to the amount of intake air, the fuel injection quantity, and the like are controlled while the engine is operated. When the ignition switch is turned OFF (IG OFF), the engine control, which is performed by the ECU in accordance with the control program and/or the control logic stored in the memory of the microcomputer, is forcedly terminated. The engine control may include the throttle position control, the ignition control, the fuel injection control, and the like.

The ECU is connected with a crank angle sensor, an accelerator position sensor, a throttle position sensor, and the like. The ECU is further connected with a cooling water temperature sensor, an intake temperature sensor, an air flow meter, and an intake air pressure sensor. The various sensors respectively output sensor signals, and the output sensor signals are A/D converted by an A/D converter and transmitted to the microcomputer of the ECU. These crank angle sensor, the accelerator position sensor, the throttle position sensor, the cooling water temperature sensor, the intake temperature sensor, the air flow meter, and the like configure an operation state detecting unit for detecting an operation state of the engine. The ECU performs a feedback control of electric power supplied to the coil of the motor so as to reduce a deviation between the accelerator position signal, which is outputted from the accelerator position sensor, and the throttle position signal, which is outputted from the throttle position sensor.

The blow-by gas reduction device functions as a positive crankcase ventilation device (PCV device). The PCV device is configured to draw blow-by gas, which is emitted into a crank chamber of the crankcase of the engine, and return the blow-by gas into an intake system such as a surge tank or an intake manifold of the engine, thereby burning the returned blow-by gas in the engine. The PCV device is further configured to lead pure fresh air, which is filtered by the air cleaner and removed of impurities, into the crankcase, thereby ventilating the crankcase. The PCV device includes a fresh air introduction hose and a blow-by gas reflux hose. The fresh air introduction hose connects the engine, in particular, the crank chamber of the crankcase with the intake passage 11 inside the air cleaner hose 7. The blow-by gas reflux hose connects the inside of engine, in particular, the inside of a cylinder head cover with the surge tank or the intake manifold. The PCV hose therein defines a fresh air introduction passage for leading pure fresh air (clean air) filtered by the air cleaner into the engine, in particular, the crank chamber of the crankcase. The blow-by gas reflux hose therein defines a blow-by gas reflux passage for returning blow-by gas (PCV gas), which is emitted from the crank chamber, into the engine intake system such as the surge tank or the intake manifold. The PCV valve is provided midway through the blow-by gas reflux passage for opening and closing the blow-by gas reflux passage according to the operation state of the engine.

Next, operations of the air cleaner hose 7 are described with reference to FIG. 1 to FIG. 3. The air cleaner hose 7 is formed of an elastic material such as a rubber material or a resin material having flexibility. The air cleaner hose 7 includes a straight pipe portion 31, a bellows tube portion (accordion portion) 32, a bend portion 33, a bellows tube portion (accordion portion) 34, and a straight pipe portion 35. The straight pipe portion 31 is airtightly joined with the downstream end of the air cleaner case. The bellows tube portion (accordion portion) 32 is provided downstream of the straight pipe portion 31. The bend portion 33 is provided downstream of the bellows tube portion 32. The bellows tube portion (accordion portion) 34 is provided downstream of the bend portion 33. The straight pipe portion 35 is provided downstream of the bellows tube portion 34. The straight pipe portion 31 is fitted to the outer circumferential periphery of the downstream end of the air cleaner case and screwed and fixed to the downstream end of the air cleaner case by using an air hose band 36. The bellows tube portion 32, which has multiple bellows peak portions, is provided between the straight pipe portion 31 and the bend portion 33. The bend portion 33 is substantially circularly bent at a right angle to connect the bellows tube portion 32 with the bellows tube portion 34. The bellows tube portion 34, which has multiple bellows peak portions, is provided between the bent portion 33 and the straight pipe portion 35. The straight pipe portion 35 is fitted to the outer circumferential periphery of the upstream end of the throttle valve 3, and the straight pipe portion 35 is screwed and fixed to the upstream end of the throttle valve 3 by using an air hose band 37.

The air cleaner hose 7 is airtightly joined with the upper end in the gravity direction of the throttle body 2. The air cleaner hose 7 therein defines the intake passage 11 located upstream of the throttle valve 3. The bend portion 33 of the air cleaner hose 7 is provided with a PCV port 9, which is substantially in a circle shape in cross section. The PCV port 9 is located at the side of the bellows tube portion 34 and inserted with an union pipe 6. The union pipe 6 is formed of, for example, a resin material such as thermoplastics. The union pipe 6 may be formed of poly phenylene sulfide (PPS), polyamide (PA), polypropylene (PP), or polyetherimide (PEI). The union pipe 6 functions as a joint for coupling one end of the PCV hose of the PCV device with the PCV port 9 of the air cleaner hose 7. The union pipe 6 therein defines a fresh air introduction passage (communication passage) 12, which communicates the fresh air introduction passage in the PCV hose with the intake passage 11 inside the air cleaner hose 7. The union pipe 6 includes a small diameter portion, a large diameter portion, and a conical cylinder portion. The small diameter portion is located closer to the PCV hose. The large diameter portion is located closer to the PCV port and larger in diameter than the small diameter portion. The conical cylinder portion connects the small diameter portion with the large diameter portion. The small diameter portion of the union pipe 6 functions as a PCV hose fitted portion, which is inserted to the inner circumferential periphery of one end of the PCV hose. The large diameter portion of the union pipe 6 functions as a PCV port fitted portion, which is inserted to the inner circumferential periphery of the PCV port 9.

The PCV port 9 as a fresh air introduction port (communication passage) communicates the engine, in particular, the crank chamber inside the crankcase with the intake passage 11 upstream of the throttle valve 3 inside the air cleaner hose 7 through the PCV pipe and the union pipe 6. The PCV port 9 is defined in a union joint portion 10, which is substantially in a circular shape and integrally formed with the air cleaner hose 7. The union joint portion 10 extends from the outer circumferential periphery of the air cleaner hose 7 in the tangential direction of the air cleaner hose 7. The union joint portion 10 has a tip end provided with a union fitted portion 39 to which the large diameter portion of the union pipe 6 is inserted. The PCV port 9 has an opening 13 at the side of a root of the union joint portion 10. The opening 13 is located in a hose wall surface at least in the vicinity of an area at the upper side of the bearing 5 with respect to the gravity direction. Referring to FIG. 1, the union pipe 6 and the PCV port 9 have a condensate passage, which extends substantially straight in the passage direction of the PCV port 9 from the fresh air introduction passage 12 to the upstream end (start portion) of a guide groove 14.

According to the present embodiment, the hose wall surface of the air cleaner hose 7 defines the condensate passage. The condensate passage connects a lowest location, which is in the vicinity of a lowest point of the opening 13 of the PCV port 9 in the gravity direction, with a target location (location from which condensate is to be dropped) to which condensate is to be dropped. The condensate passage is defined by the guide groove 14, which extends circularly from the lowest location to the target location, from which condensate is to be dropped, along the hose wall surface of the air cleaner hose 7. The lowest location is in the vicinity of the lowest point of the opening 13 of the PCV port 9 in the gravity direction. The target location, from which condensate is to be dropped, is at the hose wall surface and in the vicinity of an area, which is shifted by 90° from the pair of bearings 5 along the circumferential direction of the inner circumferential periphery of the air cleaner hose 7. In the present embodiment, the target location, from which condensate is to be dropped, i.e., the end portion of the guide groove 14 is located in one bellows peak portion of the bellows tube portion 34 of the air cleaner hose 7, when being viewed from the outside of the air cleaner hose 7. That is, the target location is located in one bellows dip portion of the bellows tube portion 34 when being viewed from the inside of the air cleaner hose 7. The target location, from which condensate is to be dropped, may be at the hose wall surface and in the vicinity of a point (first point) directly above the warm water heating unit, which hearts the throttle body 2, in particular, the cylinder portion 23, using warm water.

In the present embodiment, the second disc portion is located at the lower side of both the first disc portion and the shaft 4 with respect to the gravity direction when the throttle valve 3 is in the full close position. Accordingly, when condensate drips to the surface of the first disc portion of the throttle valve 3, and when the condensate drop cannot get over the shaft 4, the condensate drop may flow to both axial ends of the shaft 4 along the shaft 4. In this case, the condensate drop may consequently infiltrate into the shaft bearings 25. Therefore, the target location, from which condensate is to be dropped, is preferably at the outer circumferential periphery of the second disc portion of the throttle valve 3 in the vicinity of the point (third point), which is shifted by 90° from the pair of bearings 5 along the inner circumferential periphery of the air cleaner hose 7. That is, the end portion of the guide groove 14, which corresponds to the target location, is preferably located at the hose wall surface and in the vicinity of an area directly above a position of the outer circumferential periphery of the second disc portion, the position being most distant from the center axis of the shaft 4.

(Operation of First Embodiment)

Next, an operation of the electronic throttle device 1 as the intake control device and the PCV device for the internal combustion engine according to the present embodiment is briefly described with reference to FIGS. 1 to 3. When the ignition switch is turned on, e.g., the ignition key switch is turned on (IG-ON), the ECU starts control of energization of the motor of the throttle valve 3 and the like of the electronic throttle device 1. In addition, the ECU further actuates the ignition device, such as the ignition coil and the sparkplug, and the fuel injection device, such as the electric fuel pump and the injector. Thus, the engine is operated. In the present condition, the ECU inputs the accelerator position signal, which is outputted from the accelerator position sensor and changed in accordance with depression of the accelerator pedal by the driver. The ECU supplies electric power to the motor so as to rotate the output shaft of the motor, thereby controlling the throttle valve 3 at a predetermined throttle position corresponding to a predetermined rotation angle. Thus, the shaft 4, which is connected with the output shaft of the motor, is rotated against biasing force of the return spring by a rotation angle corresponding to the depression (accelerator manipulation) of the accelerator pedal. Thus, the shaft 4 rotates, thereby the throttle valve 3, which is supported by the shaft 4, is actuated in the opening direction from the full close position toward the full open position.

When a specific cylinder of the engine starts an intake stroke subsequent to an exhaust stroke, an intake valve opens and the specific piston downwardly moves in the specific cylinder. In the present condition, pressure in the combustion chamber of the cylinder further decreases further less than atmospheric pressure according to downward movement of the piston, thereby fuel-air mixture is drawn from the opening intake port into the combustion chamber. In the present condition, the throttle body 2 opens the throttle bore 21, 22, which is located midway through the air intake duct, according to the valve angle corresponding to the throttle position of the electronic throttle device 1. Thus, engine speed is changed corresponding to the depression (accelerator manipulation) of the accelerator pedal.

At the time of a partial-load operation, such as an idling operation, the throttle position of the electronic throttle device 1 is relatively small. In such a partial-load operation, negative pressure occurs in the throttle bore 22 downstream the throttle valve 3 in the intake passage. In the present condition, when the PCV valve of the PCV device opens, PCV gas is drawn by negative pressure from the crank chamber of the crankcase inside the engine into the intake passage downstream of the throttle valve 3. Accordingly, air flows in the fresh air introduction passage and the blow-by gas reflux passage toward the surge tank or the intake manifold.

More specifically, clean air, which is filtered through the air cleaner, flows from the PCV port 9 of the air cleaner hose 7 into the crank chamber of the crankcase after passing through the fresh air introduction passage. Whereby, the crank chamber is ventilated. Further, PCV gas and clean air flow into the intake passage downstream of the throttle valve 3 after passing through the blow-by gas reflux passage. In the present operation, PCV gas, which is emitted in the crank chamber, is returned into the intake passage downstream of the throttle valve 3 and led into the combustion chamber of each engine cylinder, thereby re-combusted. Thus, engine oil can be restricted from deterioration, and increase in internal pressure in the crank chamber can be suppressed. Whereby, operation of the piston can be maintained. On the other hand, when the throttle position of the electronic throttle device 1 is at maximum in the condition where the throttle valve 3 is in the full open position, negative pressure becomes significantly small in the intake passage downstream of the throttle valve 3. Alternatively, pressure in the intake passage downstream of the throttle valve 3 becomes substantially the same as the atmospheric pressure. In the present condition, even when the PCV valve opens, PCV gas, which is exerted with negative pressure, cannot be sufficiently returned into the intake passage downstream of the throttle valve 3 through the blow-by gas reflux passage. Otherwise, when the throttle valve 3 is in the full open position, intake air flow through the intake passage 11 in the air cleaner hose 7 and the throttle bore 21, 22 in the throttle body 2 becomes maximum. In the present condition, PCV gas, which is emitted in the crank chamber; is entrained in the intake air flow through the intake passage 11 and introduced from the opening 13 of the PCV port 9 to the intake passage 11 upstream of the throttle valve 3 through the fresh air introduction passage. Thus, together with intake air, PCV gas flows from the intake passage 11 upstream of the throttle valve 3 into the intake passage downstream of the throttle valve 3.

(Effect of First Embodiment)

According to the present embodiment, the guide groove (condensate passage) 14 is located in the hose wall surface of the air cleaner hose 7 at the directly upper side of the throttle body 2 of the electronic throttle device 1 including the downdraft. The condensate passage connects the lowest location, which is in the vicinity of the lowest point of the opening 13 of the PCV port 9 in the gravity direction, with the target location from which condensate is to be dropped. The guide groove 14 extends circularly from the lowest location, which is in the vicinity of the lowest point of the opening 13 of the PCV port 9 in the gravity direction, to the target location, from which condensate is to be dropped. The target location is in the vicinity of the point (third point), which is shifted by 90° from the bearing 5 along the inner circumferential periphery of the air cleaner hose 7.

In the present structure, even when condensate flows out of the opening 13 of the PCV port 9, the condensate can be released to the location in the vicinity of the point, which is shifted by 90° from the bearing 5 in the direction of the inner circumferential periphery of the air cleaner hose 7. Thus, condensate flowing out of the opening 13 of the PCV port 9 is induced to the target location from which condensate is to be dropped, (location to be dropped with condensate), by the guide groove 14 provided in the hose wall surface of the air cleaner hose 7. Thereafter, the condensate drips into the target location. The target location may be distant from the directly upper side of the bearing 5, for example. Therefore, even in the electronic throttle device 1 having the downdraft structure in which the PCV port 9 opens in the vicinity of the directly upper side of the bearing 5, condensate flowing out of the opening 13 of the PCV port 9 can be restricted from directly dripping into the bearing 5. In the present structure, the bearing 5 can be protected from direct fall of condensate, and hence the bearing 5 and the gap between the sliding surface of the bearing 5 and the shaft 4 of the throttle valve 3 can be protected from permeation of condensate.

Further, the target location, from which condensate is to be dropped, i.e., the end portion of the guide groove 14 is preferably near the point, which is shifted by 90° from the bearing 5 in the direction of the inner circumferential periphery of the air cleaner hose 7. That is, the target location is preferably distant from the center axis of the shaft 4 and at the outer circumferential periphery of the second disc portion of the throttle valve 3. The condensate flows into the throttle bore 22 located downstream of the throttle valve 3, i.e., lower side of the throttle valve 3, in response to opening of the throttle valve 3.

In the present operation, condensate, which flows out of the opening 13 of the PCV port 9, is released to the target location, from which condensate is to be dropped. Therefore, the bearing 5 and the gap between the wall surface defining the bearing hole of the bearing 5 and the sliding surface of the shaft 4 of the throttle valve 3 can be protected from permeation of condensate. Thus, the throttle valve 3 and the shaft 4 can be protected from causing icing. Further, seizure, failure, i.e., malfunction, and shaft lock due to icing of the throttle valve 3 and the shaft 4 can be steadily restricted.

Second Embodiment

Figure 5:
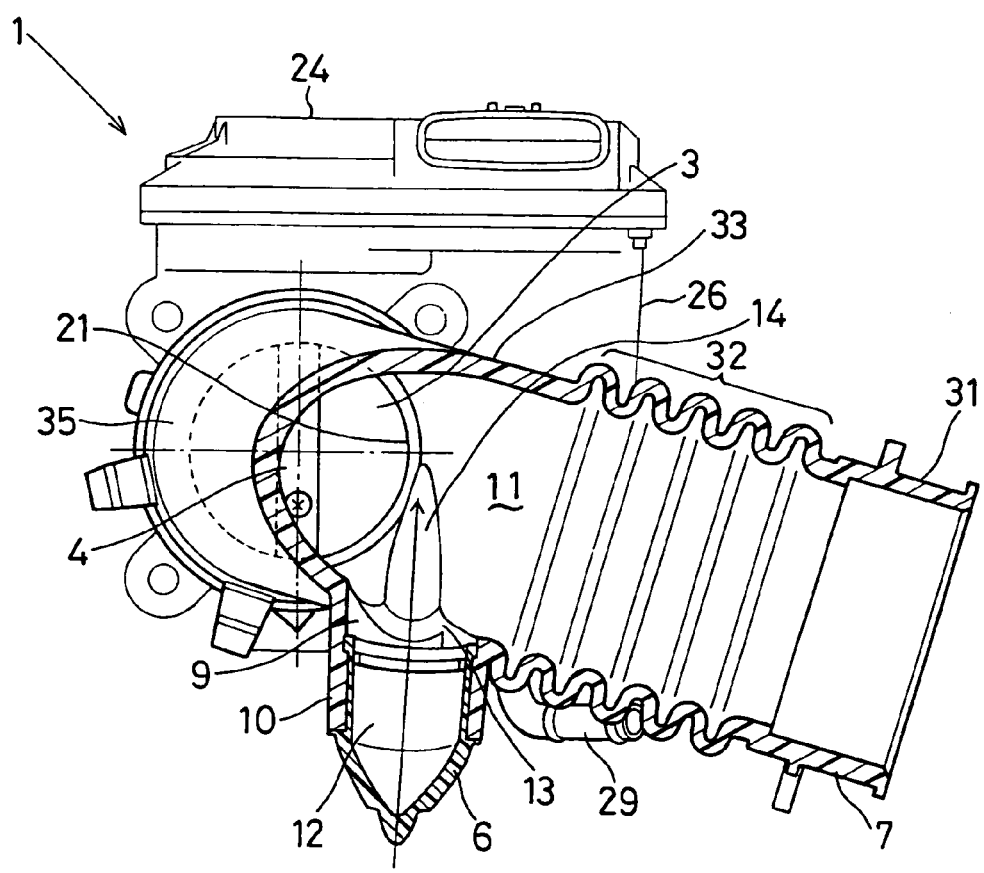
FIG. 5 is a partially sectional view showing an electronic throttle device equipped with an air cleaner hose, according to a second embodiment.
Figure 6:
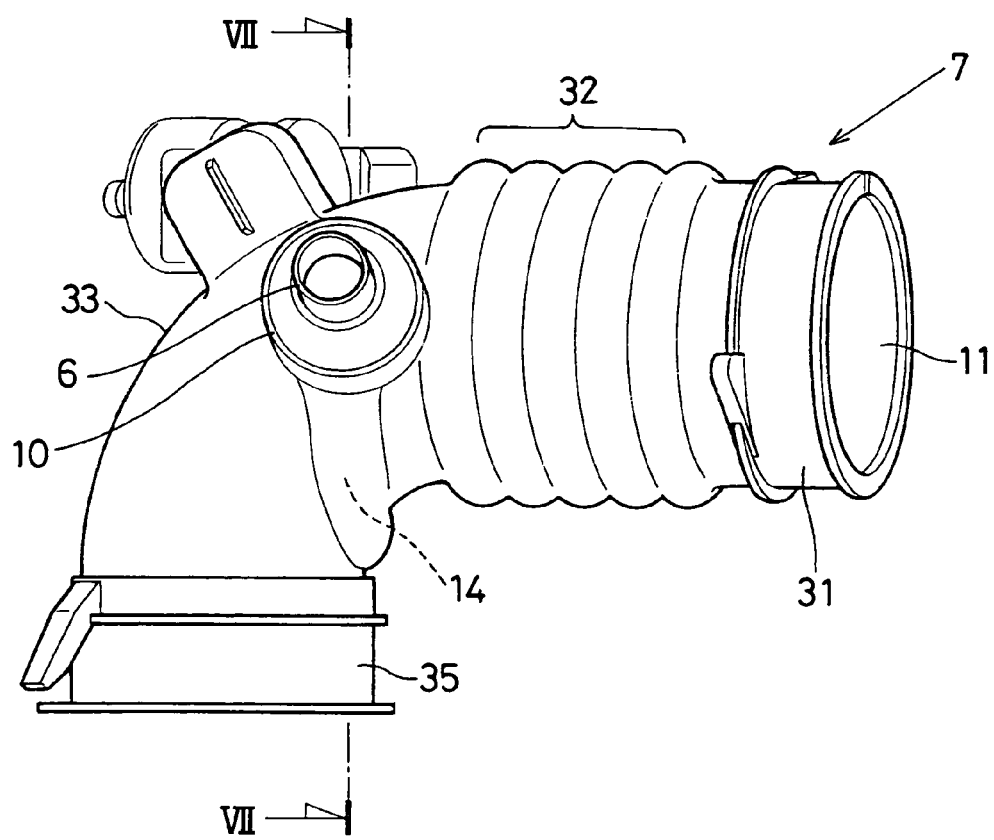
FIG. 6 is a lateral view showing the electronic throttle device equipped with the air cleaner hose and a union pipe, according to the second embodiment.
Figure 7:
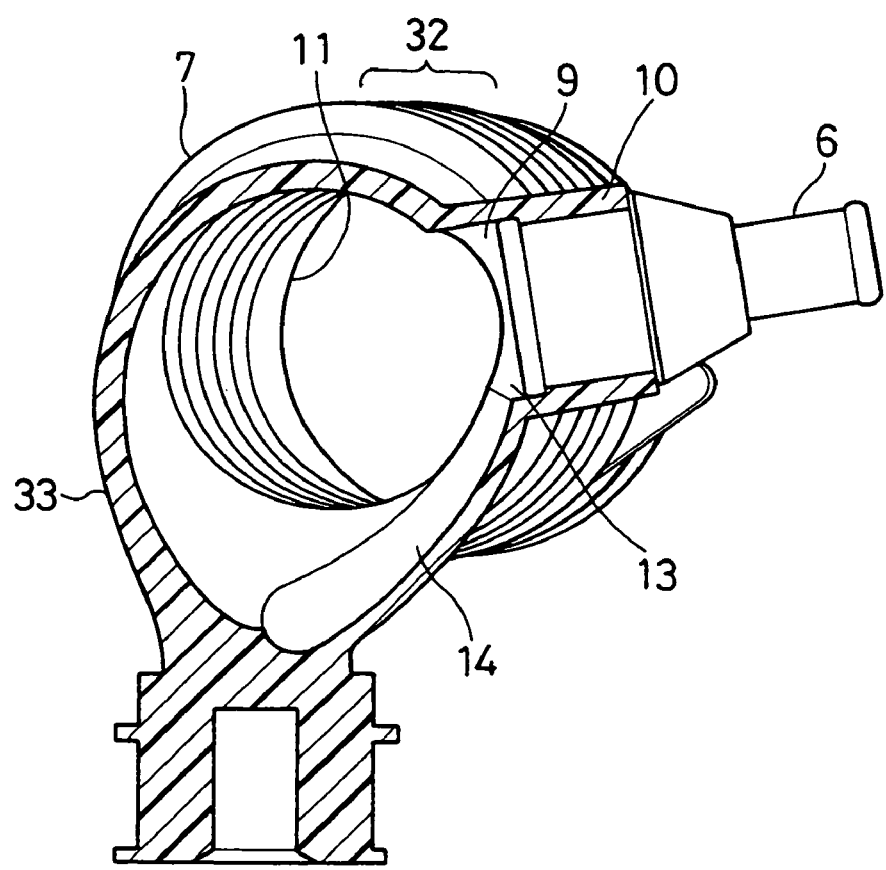
FIG. 7 is a sectional view taken along with the line VII-VII in FIG. 6, according to the second embodiment.

The present second embodiment will be described with reference to FIGS. 5 to 7. FIG. 5 shows an electronic throttle device equipped with an air cleaner hose according to the present second embodiment. FIGS. 6, 7 show the air cleaner hose and a union pipe according to the present second embodiment. Referring to FIG. 5, in the present embodiment, the union pipe 6 and the PCV port 9 have the condensate passage, which extends substantially straight in the passage direction of the PCV port 9 from the fresh air introduction passage 12 to the upstream end (start portion) of the guide groove 14. In the present embodiment, the passage direction of the PCV port 9 is substantially in parallel with the axial direction of the shaft 4 of the throttle valve 3. In addition, according to the present embodiment, the air cleaner hose 7 is not provided with the bellows tube portion 34, and the bend portion 33 is directly connected with the straight pipe portion 35. The hose wall surface of the air cleaner hose 7 extends from the bend portion 33 to the straight pipe portion 35 and defines the condensate passage. The condensate passage connects the lowest location, which is in the vicinity of a lowest point of the opening 13 of the PCV port 9 in the gravity direction, with the target location from which condensate is to be dropped.

The condensate passage is defined by the guide groove 14, which extends circularly from the lowest location to the target location, from which condensate is aimed to be dropped, along the hose wall surface of the air cleaner hose 7. The lowest location is in the vicinity of the lowest point of the opening 13 of the PCV port 9 in the gravity direction. The target location, from which condensate is aimed to be dropped, is at the hose wall surface and in the vicinity of an area, which is shifted by 90° from the pair of bearings 5 along the circumferential direction of the inner circumferential periphery of the air cleaner hose 7. The target location, from which condensate is aimed to be dropped, may be at the hose wall surface and in the vicinity of a point (second point) directly above the warm water heating unit, which hearts the throttle body 2, in particular, the cylinder portion 23, using warm water. As described above, the electronic throttle device 1 having the downdraft structure according to the present embodiment is capable of produce an effect similarly to the first embodiment.

Third Embodiment

Figure 8:
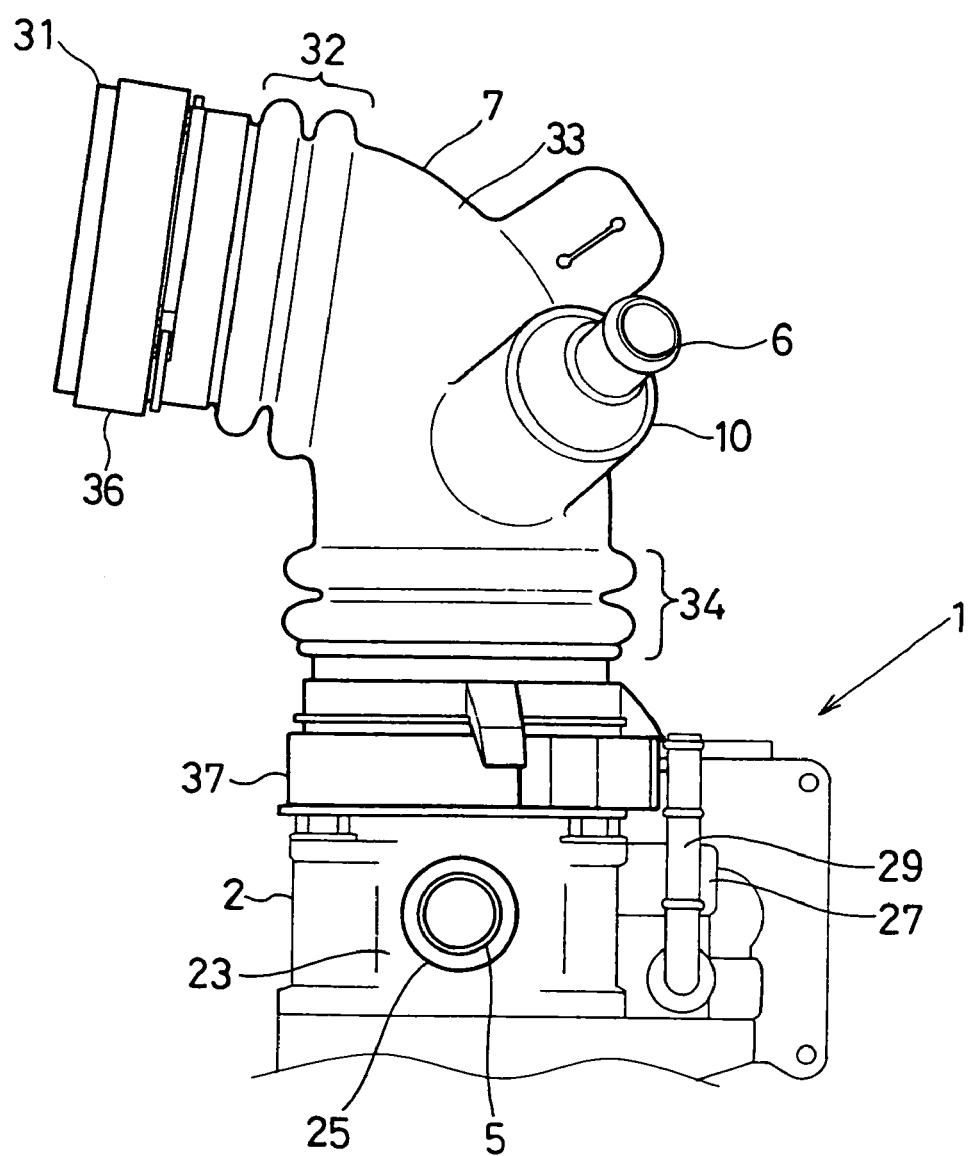
FIG. 8 is a lateral view showing an electronic throttle device equipped with an air cleaner hose, according to a third embodiment.
Figure 9:
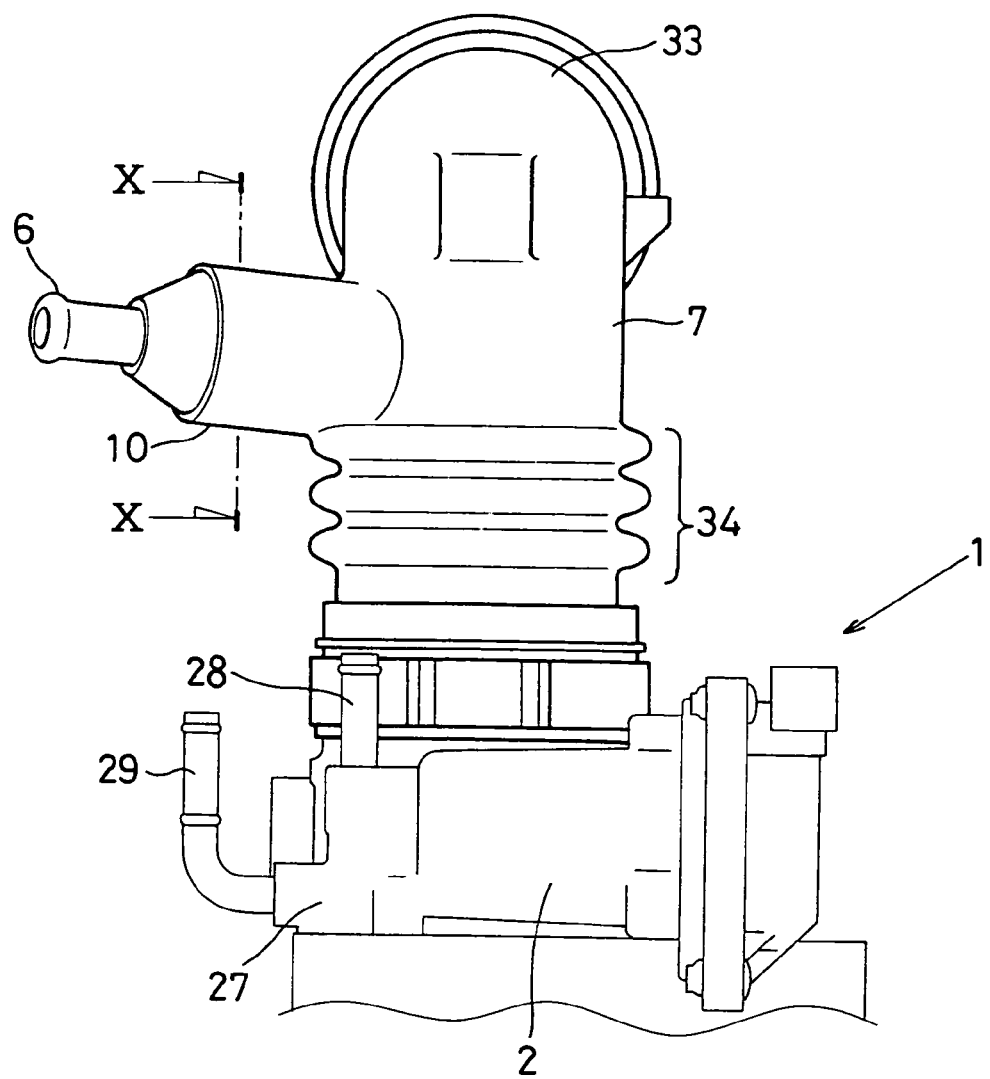
FIG. 9 is a side view showing the electronic throttle device equipped with the air cleaner hose, according to the third embodiment.

The present third embodiment will be described with reference to FIGS. 8 to 11B. FIGS. 8, 9 depict an electronic throttle device equipped with an air cleaner hose. In the electronic throttle device 1 having the downdraft structure according to the present embodiment, the straight pipe portion 35 of the air cleaner hose 7 is airtightly joined with the upper end of the throttle body 2 in the gravity direction. That is, the straight pipe portion 35 of the air cleaner hose 7 is airtightly joined with the upper portion of the throttle body 2 in the vertical direction.

Figure 10A:
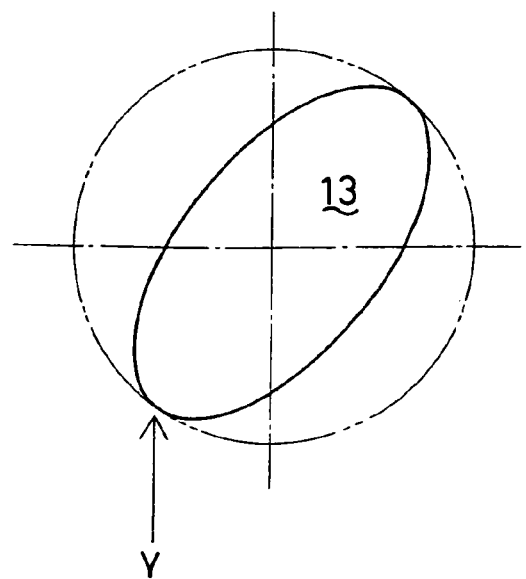
FIGS. 10A to 10C are sectional views each being taken along with the line X-X in FIG. 9, according to the third embodiment.
Figure 10B:
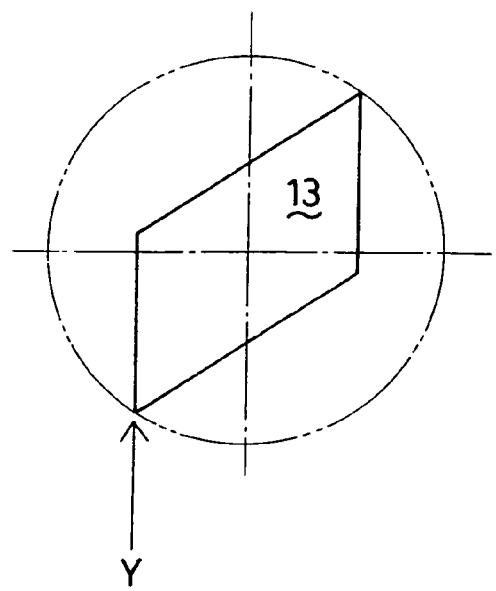
Figure 10C:
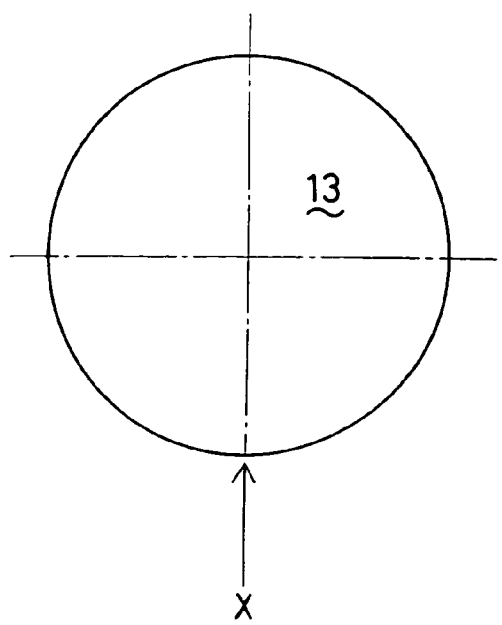

As shown in FIG. 10C, the opening 13 of the PCV port 9 is, in general, substantially in a circular shape in cross section. In the present structure, condensate, which reaches the opening 13 of the PCV port 9, drips and falls from the lowest point X of the opening 13 in the gravity direction. The lowest point X substantially coincides with the center of the opening 13 depicted by the dashed line in FIG. 10C. Accordingly, in a structure in which the opening 13 of the PCV port 9 opens directly above the bearing 5, condensate may drip from the lowest point X of the opening 13 in the gravity direction and may directly fall onto the bearing 5. In this case, the condensate may infiltrate into the bearing 5 and the gap between the hole wall face of the bearing hole of the bearing 5 and the sliding surface of the shaft 4 of the throttle valve 3.

Therefore, according to the present embodiment, as shown in FIG. 10A, the opening 13 of the PCV port 9 is substantially in an oval shape in cross section. Alternatively, according to the present embodiment, as shown in FIG. 10B, the opening 13 of the PCV port 9 may be substantially in a parallelogram in cross section. As described above, the cross section of the opening 13 of the PCV port 9 may be determined to be a non-circle shape (irregular hole shape) such as an ellipse form, a parallelogram, or the like. Thus, the lowest point of the opening 13 in the gravity direction can be displaced and whereby the lowest point of the opening 13, from which condensate falls, can be shifted from the point X, which is depicted by the dashed lines in FIGS. 10A, 10B, to the point Y In the present structure, the target location, from which condensate is to be dropped, can be shifted, i.e., displaced from the point directly above the bearing 5. That is, the lowest point in the opening 13 of the PCV port 9 in the gravity direction can be determined away from the point directly above the bearing 5. Therefore, condensate comes to drip and fall from the lowest point of the opening 13 of the PCV port 9 in the gravity direction, the lowest point being away from the area around the point directly above the bearing 5. As described above, the electronic throttle device 1 having the downdraft structure according to the present embodiment is capable of produce an effect similarly to the first embodiment.

Figure 11A:
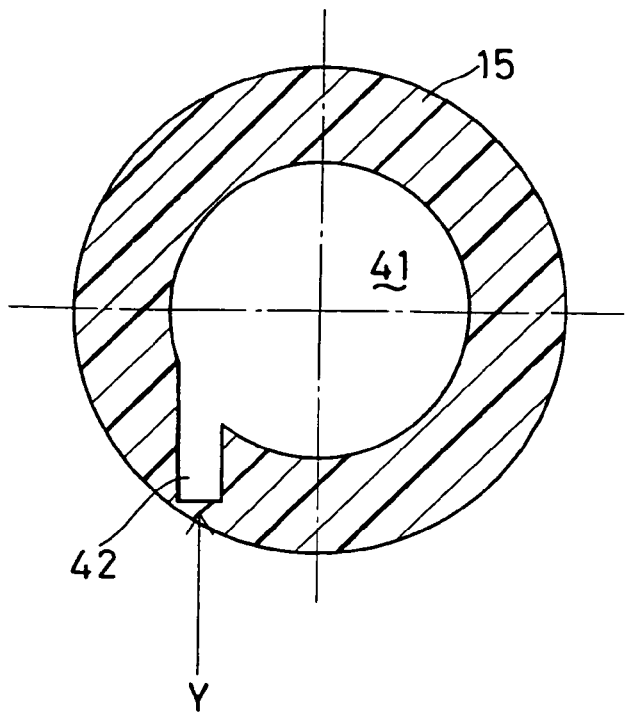
FIGS. 11A, 11B are sectional views each showing a shape of an opening of a membranous member, according to the third embodiment.

In addition, as shown in FIG. 11A, a membranous member 15 may be provided to the opening of the PCV port 9 in the present embodiment. The membranous member 15 is configured to throttle the cross-sectional area of the opening of the PCV port 9. The membranous member 15 partially surrounds the opening of the PCV port 9 and has a through hole 41, which is substantially in a circular shape and extends in the thickness direction of the membranous member 15. That is, the through hole 41 extends in the passage direction of the PCV port 9. The membranous member 15 has a condensate drain groove 42, which protrudes downward in the gravity direction from the through hole 41.

The condensate drain groove 42 extends from an opening edge of the through hole 41 in the tangential direction of the through hole 41 substantially downward in the gravity direction. The lower end of the condensate drain groove 42 in the gravity direction defines the lowest point of the through hole 41 in the gravity direction. The lowest point of the through hole 41 in the gravity direction is away from an area in the vicinity of a point directly above the bearing 5. In the present structure, condensate, which reaches the opening of the PCV port 9, is once dammed, i.e., blocked by the membranous member 15. The condensate, which likely overflows from the through hole 41, drips and falls from the condensate drain groove 42. That is, condensate drips and falls from the location away from the area directly above the bearing 5, i.e., shifted from the lowest point of the through hole 41 in the gravity direction.

Figure 11B:
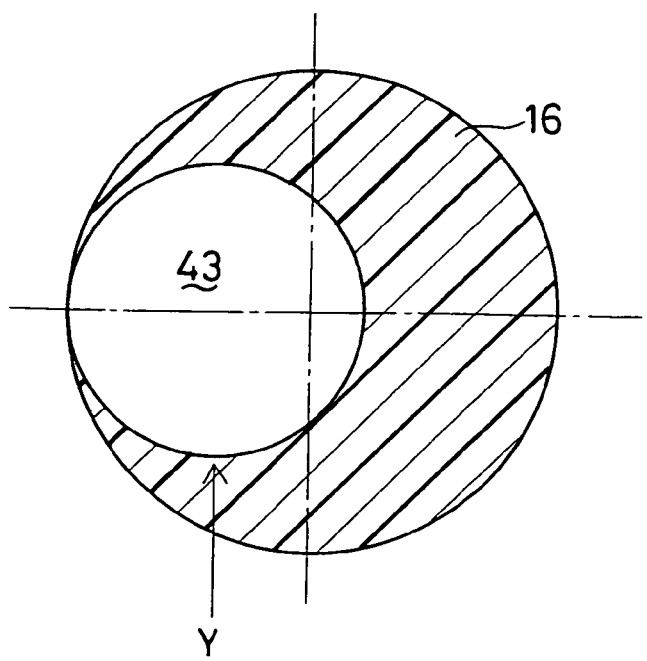

Alternatively, as shown in FIG. 11B, a membranous member 16 may be provided to the opening of the PCV port 9 in the present embodiment. The membranous member 16 is configured to throttle the cross-sectional area of the opening of the PCV port 9. The membranous member 16 partially surrounds the opening of the PCV port 9 and has a through hole 43, which is substantially in a circular shape and extends in the thickness direction of the membranous member 16. That is, the through hole 41 extends in the passage direction of the PCV port 9. The through hole 43 has the center shifted eccentricity leftward in FIG. 11B from both the center of the opening of the PCV port 9 and the center of the membranous member 16, which are depicted by the dashed line in FIG. 11B.

As described above, the membranous member 15, 16 is provided to the opening of the PCV port 9, and whereby the lowest point of the opening in the gravity direction can be displaced, i.e., shifted. Thus, the lowest point of the opening, from which condensate falls, can be shifted from the point X to the point Y. In the present structure, the target location, from which condensate is to be dropped, can be shifted, i.e., displaced from the point directly above the bearing 5. That is, the lowest point in the through hole 41, 43 of the membranous member 15, 16 in the gravity direction can be determined away from the point directly above the bearing 5. Therefore, condensate comes to drip and fall from the lowest point of the through hole 41, 43 of the membranous member 15, 16 in the gravity direction, the lowest point being away from the area around the point directly above the bearing 5. As described above, the electronic throttle device 1 having the downdraft structure according to the present embodiment is capable of produce an effect similarly to the first embodiment.

Further, according to the present embodiment, the throttle valve 3 and the shaft 4 can be further protected from icing without providing a guide portion to the hose wall surface of the air cleaner hose 7. That is, the hose wall surface of the air cleaner hose 7 need not be provided with, for example, a guide recessed portion dented toward the outside of the air cleaner hose 7 or a guide projected portion projected toward the inside of the air cleaner hose 7. Therefore, intake air flow through the intake passage 11 upstream of the throttle valve 3 in the air cleaner hose 7 can be restricted from disturbance caused by the additional guide portion such as the guide recessed portion and the guide projected portion. For example, disorder of intake air flow through the air cleaner hose 7 can be reduced, and therefore pressure loss in intake air flow through the air cleaner hose 7 can be suppressed.

Fourth Embodiment

Figure 12A:
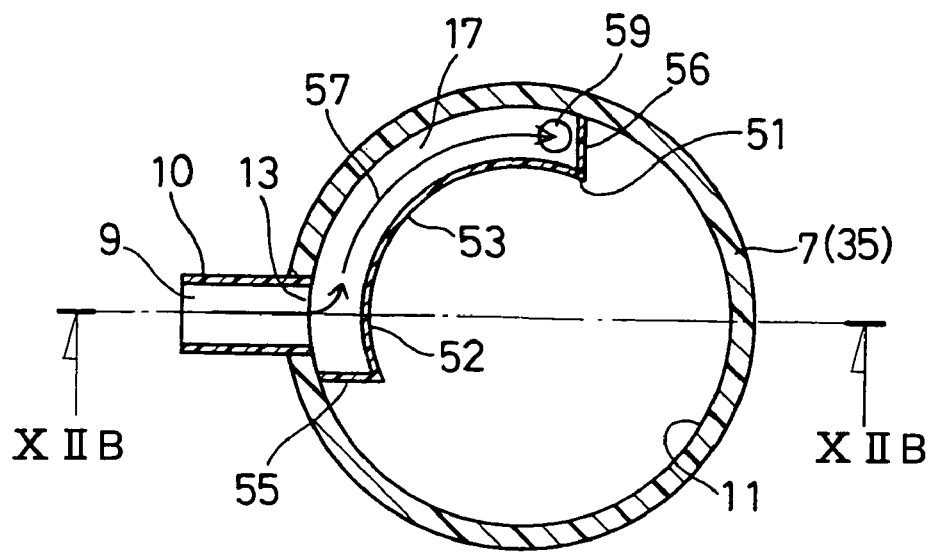
FIG. 12A is a sectional view showing a pocket of an air cleaner hose.
Figure 12B:
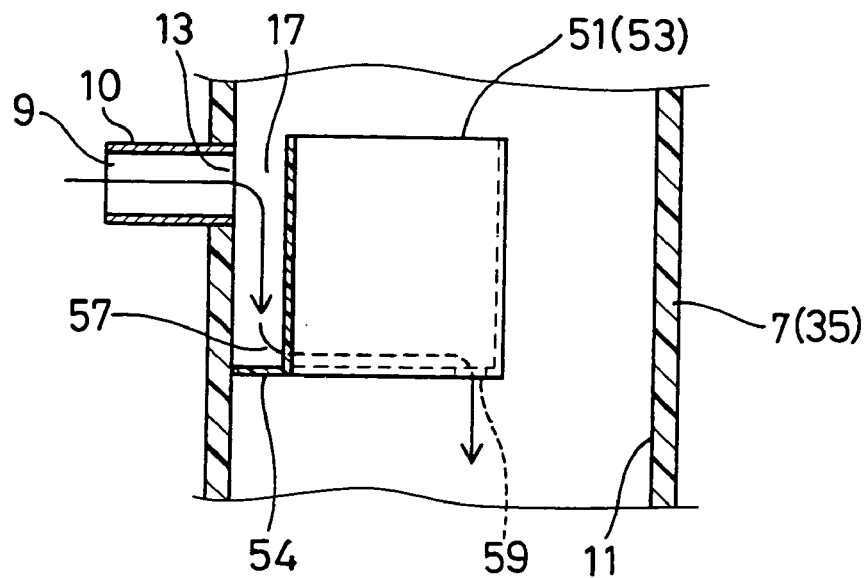
FIG. 12B is a sectional view taken along with the line XIIB-XIIB in FIG. 12A, according to a fourth embodiment.

FIGS. 12A, 12B show a pocket provided to an air cleaner hose according to the present fourth embodiment. According to the present embodiment, the opening 13 of the PCV port 9 is located in the vicinity of the point directly above the bearing 5 in the air cleaner hose 7. A partition portion 51 is integrally formed with the hose wall surface of the air cleaner hose 7. The partition portion 51 has an opposed portion 52, which is opposed to the opening 13 of the PCV port 9 at a predetermined gap. The partition portion 51 is defined by a partition plate 53, which is substantially in an arc shape and extends from the opposed portion 52 to the target location, from which condensate is to aimed be dropped, along the hose wall surface of the air cleaner hose 7.

A pocket 17 is defined by an outer wall as the straight pipe portion 35 of the air cleaner hose 7 and an inner wall as the partition plate 53, which is opposed to the hose wall surface of the air cleaner hose 7. The pocket 17 is further defined by a bottom wall 54 as a lower portion the partition portion 51 in the gravity direction and sidewalls as both side portions 55, 56 of the partition portion 51 in the circumferential direction. In the present structure, the partition portion 51 defines the pocket 17 with the hose wall surface of the air cleaner hose 7 for temporarily accumulate condensate, which flows out from the opening 13 of the PCV port 9. That is, the partition portion 51 and the hose wall surface of the air cleaner hose 7 therebetween define the pocket 17. The pocket 17 has an upper surface in the gravity direction, and the upper surface opens. The pocket 17 has a lower surface in the gravity direction, and the lower surface is at the lower side from a lowest point of the opening 13 of the PCV port 9 in the gravity direction by a predetermined depth.

The pocket therein defines the condensate passage. The condensate passage connects the lowest location, which is in the vicinity of the lowest point of the opening 13 of the PCV port 9 in the gravity direction, with the target location from which condensate is aimed to be dropped. The lower surface of the pocket 17 in the gravity direction, i.e., the bottom wall 54 as the lower portion of the partition portion 51 has a condensate drain hole 59, which is substantially in a circular-shape and opens at the target location, from which condensate is to be dropped. The target location, from which condensate is to be dropped, corresponds to the location at which the condensate drain hole 59 is defined. The target location is substantially shifted by 90° from the bearings 5 along the circumferential direction of the inner circumferential periphery of the air cleaner hose 7. The target location, from which condensate is to be dropped, may be at the hose wall surface and in the vicinity of the point directly above the warm water heating unit, which hearts the throttle body 2, in particular, the cylinder portion 23, using warm water.

As described above, according to the present embodiment, the pocket 17 (condensate passage 57) is defined between the hose wall surface of the air cleaner hose 7 and the partition portion 51. The pocket 17 extends from the lowest point of the opening 13 of the PCV port 9 in the gravity direction to the point shifted from the bearing 5 by substantially 90° in the direction of the inner circumferential periphery of the air cleaner hose 7. In the present structure, even when condensate flows out of or drips from the opening 13 of the PCV port 9, the condensate can be released to the location in the vicinity of the point, which is shifted by 90° from the bearing 5 in the direction of the inner circumferential periphery of the air cleaner hose 7. In the present structure, condensate, which flows out of or drops from the opening 13 of the PCV port 9, can be released to the location in the vicinity of the point, which is shifted by 90° from the bearing 5 in the direction of the inner circumferential periphery of the air cleaner hose 7. As described above, the electronic throttle device 1 having the downdraft structure according to the present embodiment is capable of produce an effect similarly to the first embodiment.

Furthermore, the partition plate 53 of the partition portion 51 defines the opposed portion 52, which surrounds and entirely blocks the opening 13 of the PCV port 9. Therefore, condensate, which flows out of or drips from the opening 13 of the PCV port 9, splashes in the horizontal direction of the opening 13 of the PCV port 9 by being obstructed by the opposed portion 52. Even in the present condition, the condensate is obstructed by the side portions 55, 56 in the direction of the circumference of the partition portion 51, and thereby accumulated inside the pocket 17. In the present structure, condensate, which flows out of or drips from the opening 13 of the PCV port 9, can be restricted from scattering. Therefore, the throttle valve 3 and the shaft 4 can be further protected from icing.

Fifth Embodiment

Figure 13A:
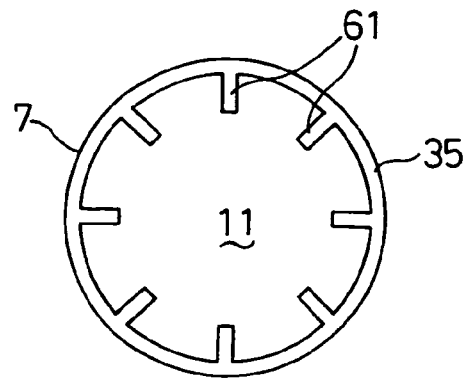
FIG. 13A is a plan view showing multiple current plates provided in an air cleaner hose.
Figure 13B:
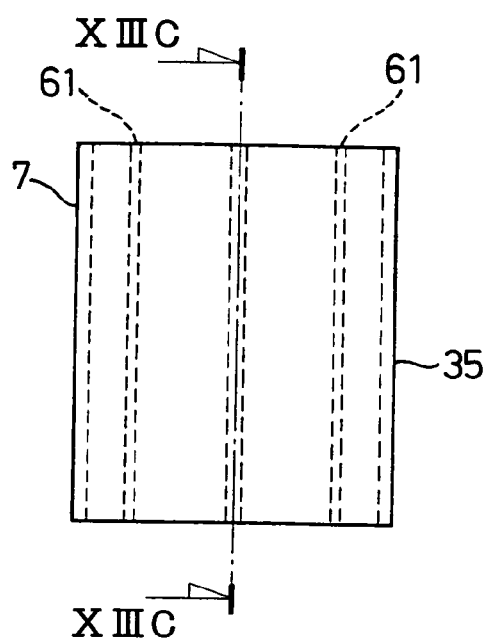
FIG. 13B is a side view showing the air cleaner hose.
Figure 13C:
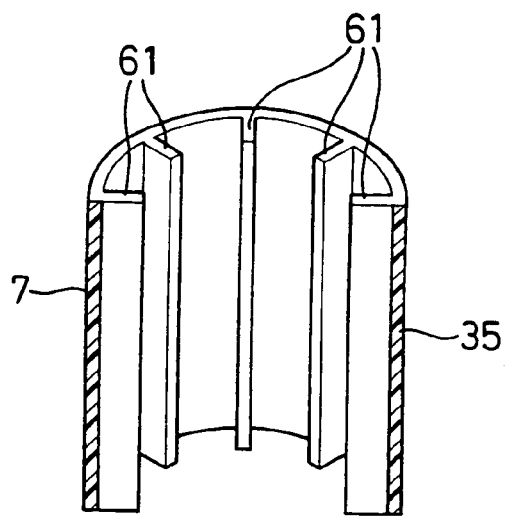
FIG. 13C is a sectional view . taken along with the line XIIIC-XIIIC in FIG. 13B, according to a fifth embodiment.

FIG. 13A shows multiple current plates provided in an air cleaner hose, and FIGS. 13B, C show an air cleaner hose, according to the present fifth invention. In the electronic throttle device 1 having the downdraft structure according to the present embodiment, the straight pipe portion 35 of the air cleaner hose 7 is airtightly joined with the upper end of the throttle body 2 in the gravity direction. That is, the straight pipe portion 35 of the air cleaner hose 7 is airtightly joined with the upper portion of the throttle body 2 in the vertical direction. According to the present embodiment, the air cleaner hose 7 has the multiple current plates (current rectifying portion) 61. The current plates 61 are, for example, integrally formed with the hose wall surface of the straight pipe portion 35 of the air cleaner hose 7. The current plates 61 extend in the axial direction of the throttle bore 21, 22 and the intake passage 11 in the throttle body 2 and the air cleaner hose 7. The multiple current plates 61 are substantially in parallel with each other and arranged at substantially predetermined regular interval in the direction of the inner circumferential periphery, i.e., hose wall surface of the air cleaner hose 7. Each of the multiple current plates 61 protrudes from the hose wall surface of the air cleaner hose 7 toward the center axis of the intake passage 11 by a predetermined projection length.

In the present structure, the multiple current plates 61 are integrally provided in the hose wall surface of the straight pipe portion 35 of the air cleaner hose 7, and whereby flow of condensate can be regulated and rectified upstream of the throttle valve 3 in the intake passage 11. Therefore, airflow can be stabilized inside the air cleaner hose 7. Thus, turbulent flow and scattering of condensate can be restricted. Furthermore, flow of condensate can be controlled in the intake passage 11 upstream of the throttle valve 3 inside the air cleaner hose 7. Therefore, condensate, which drips from the opening 13 of the PCV port 9, the guide groove 14, the condensate drain groove 42, the through hole 43, or the condensate drain hole 59, can be restricted from directly falling onto the bearing 5. In the present structure, the bearing 5 can be protected from direct fall of condensate, and hence the throttle valve 3 and the shaft 4 can be further protected from icing. The multiple current plates 61 may be applied to the structure of each of the first to fourth embodiments.

Sixth Embodiment

Figure 14A:
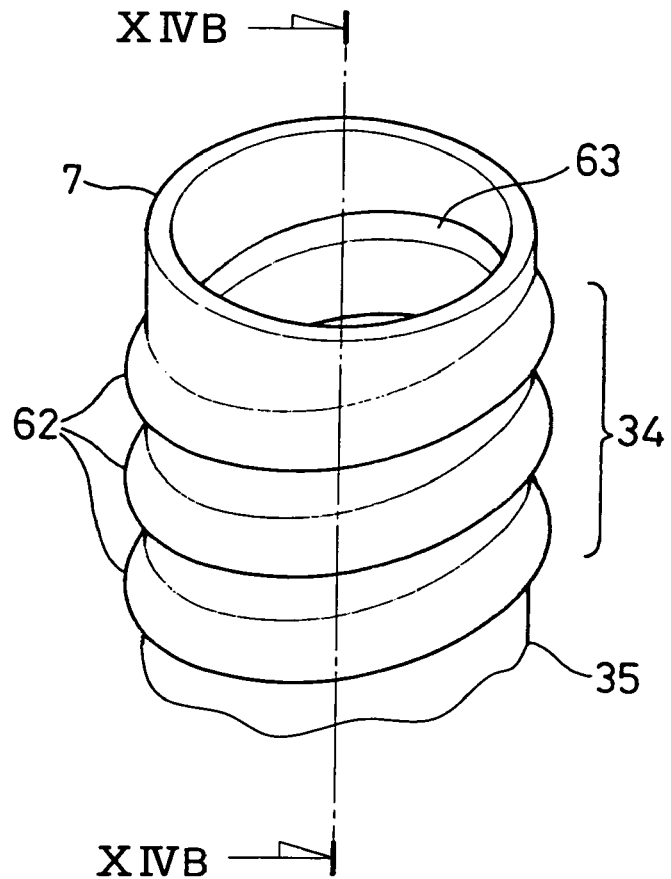
FIG. 14A is a perspective view showing a bellows tube portion provided in an air cleaner hose.
Figure 14B:
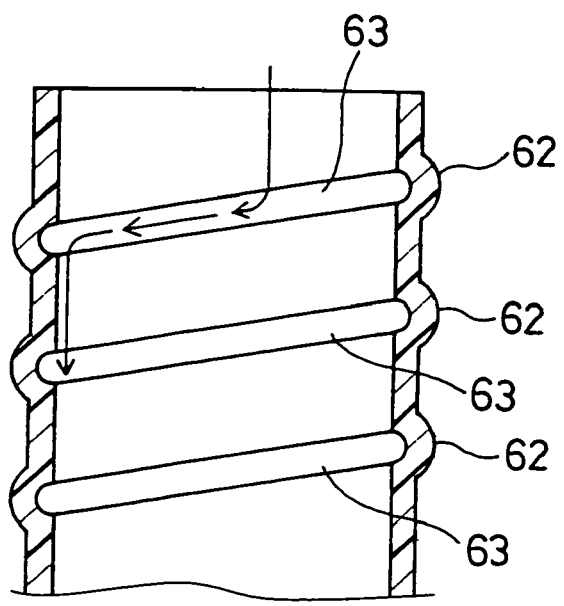
FIG. 14B is a sectional view taken along with the line XIVB-XIVB in FIG. 14A according to a sixth embodiment.
Figure 15:
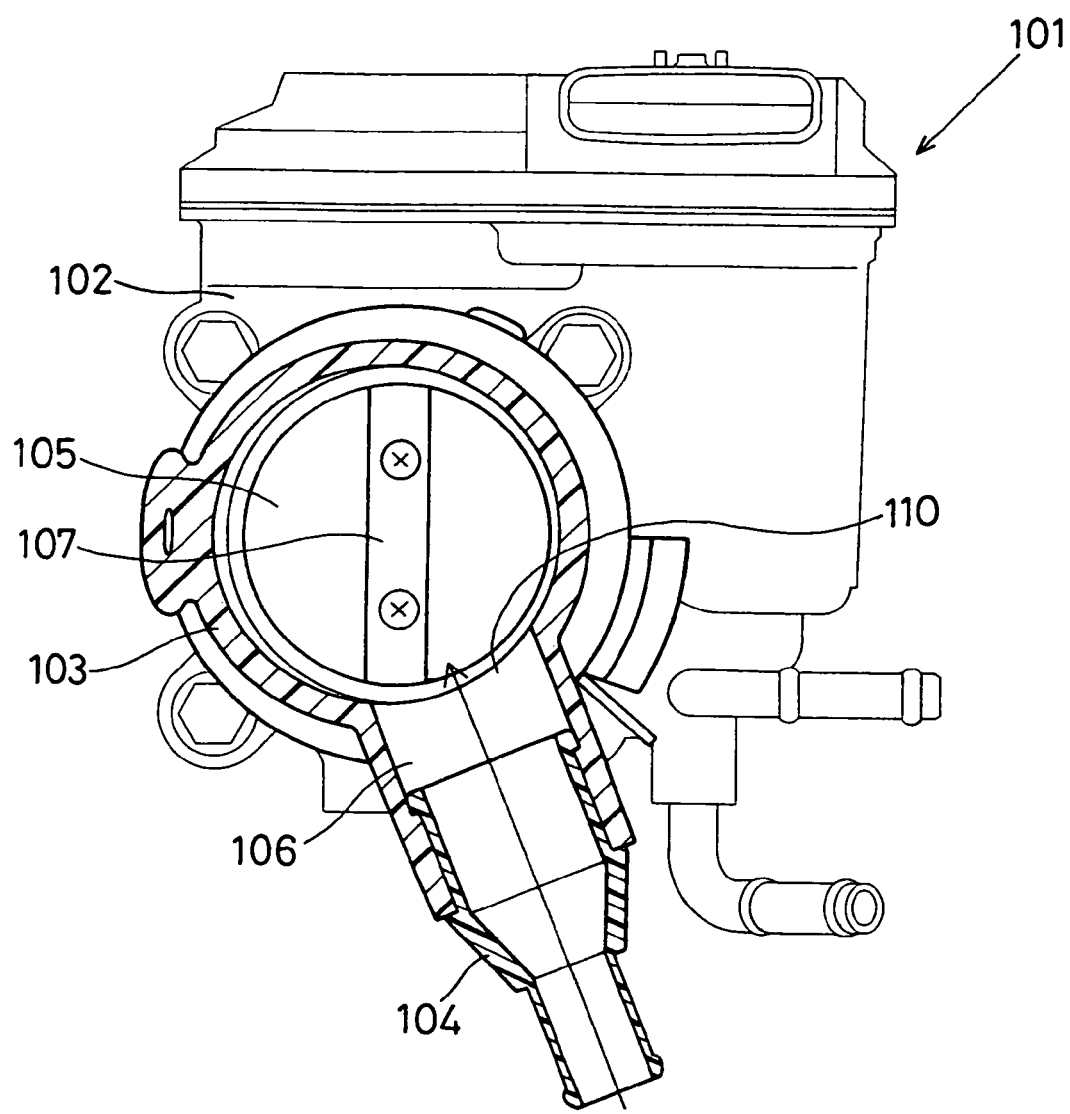
FIG. 15 is a partially sectional lateral view showing an electronic throttle device equipped with an air cleaner hose, according to a related art.
Figure 16:
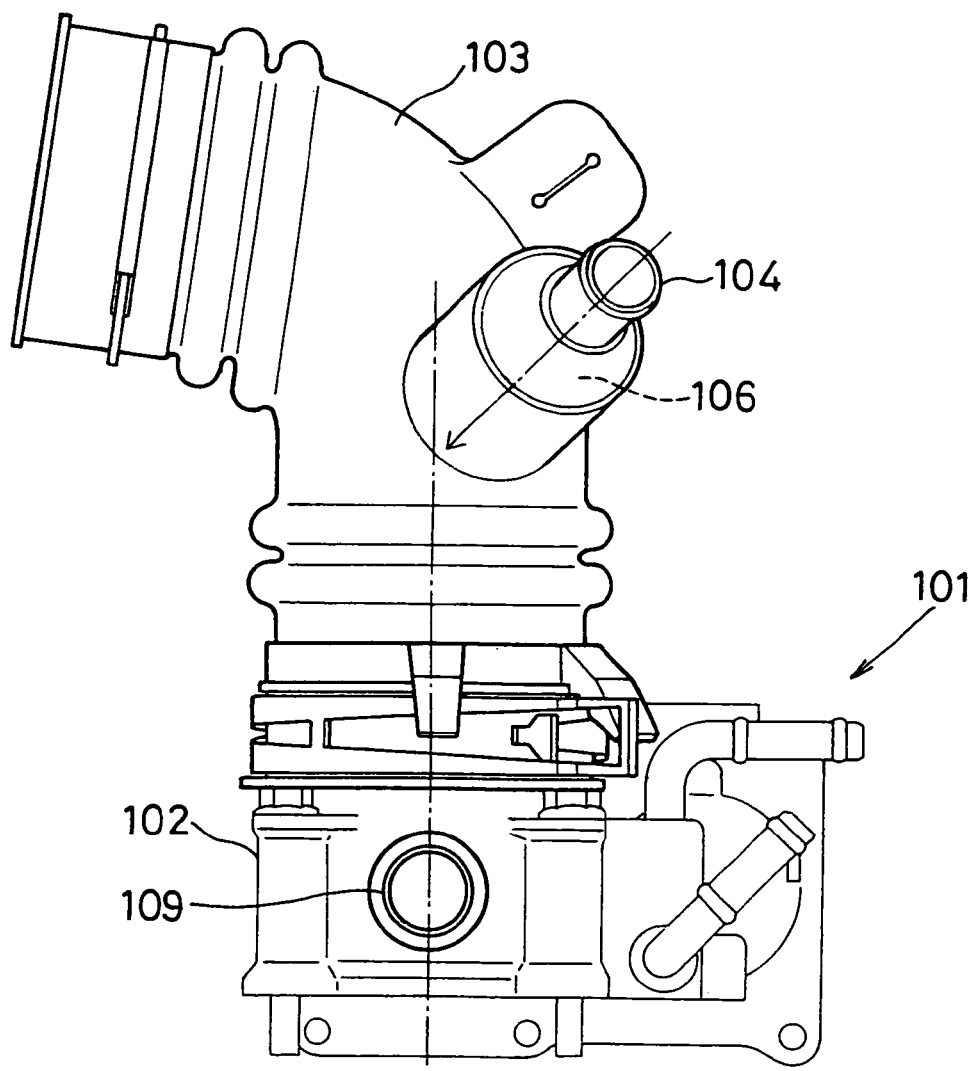
FIG. 16 is a lateral view showing the electronic throttle device equipped with the air cleaner hose, according to the related art.
Figure 17:
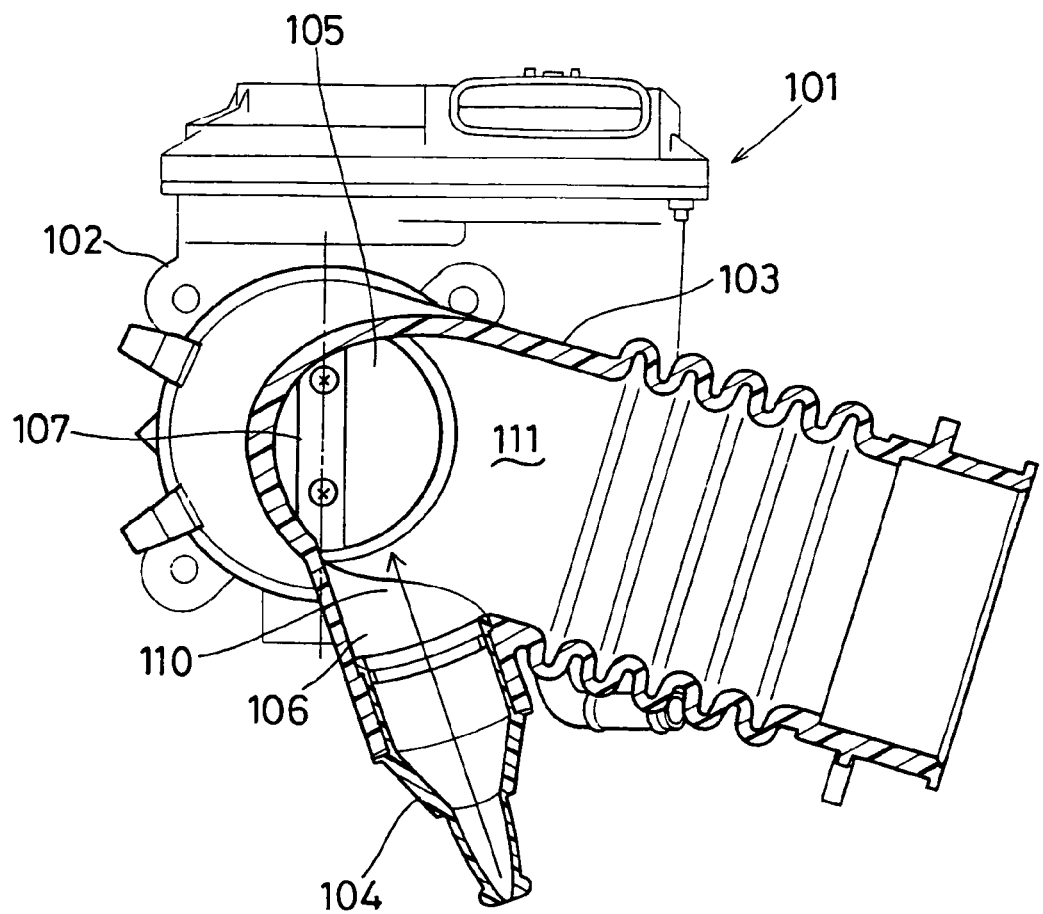
FIG. 17 is a partially sectional lateral view showing the electronic throttle device equipped with the air cleaner hose, according to the related art.
Figure 18:
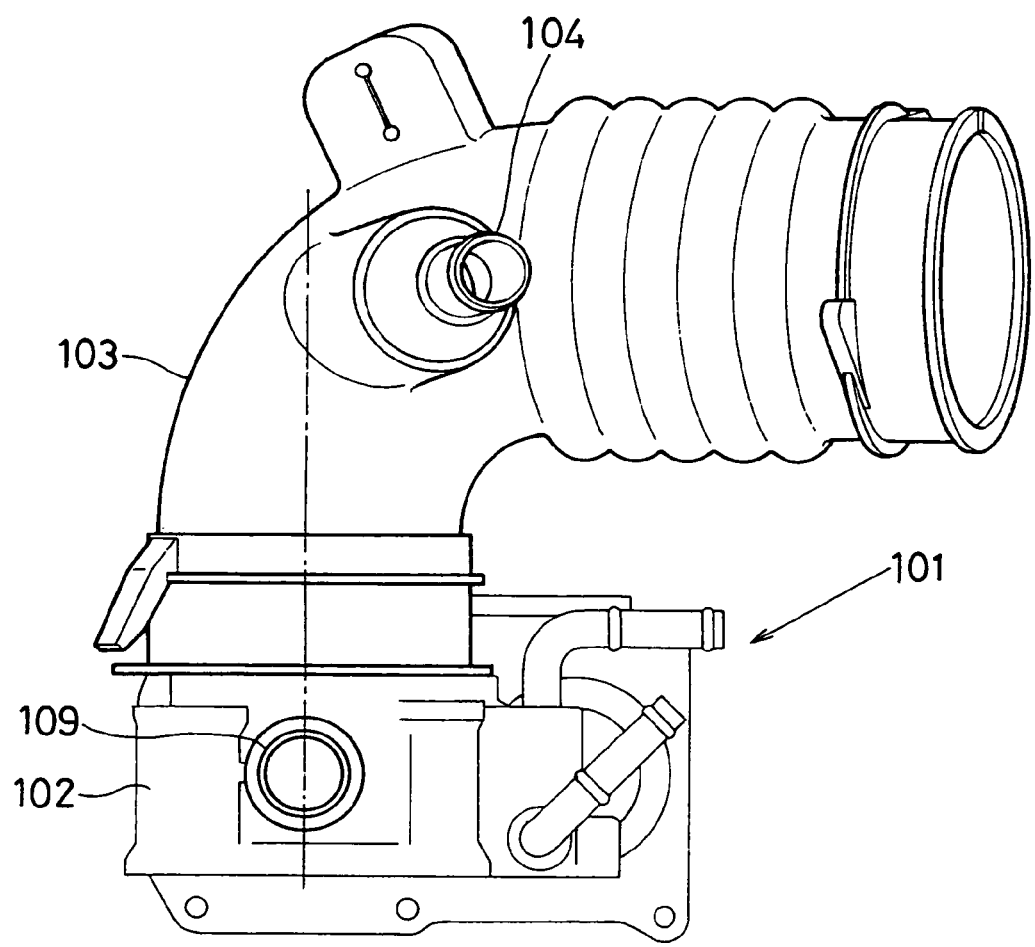
FIG. 18 is a lateral view showing the electronic throttle device equipped with the air cleaner hose, according to the related art.
Figure 19:
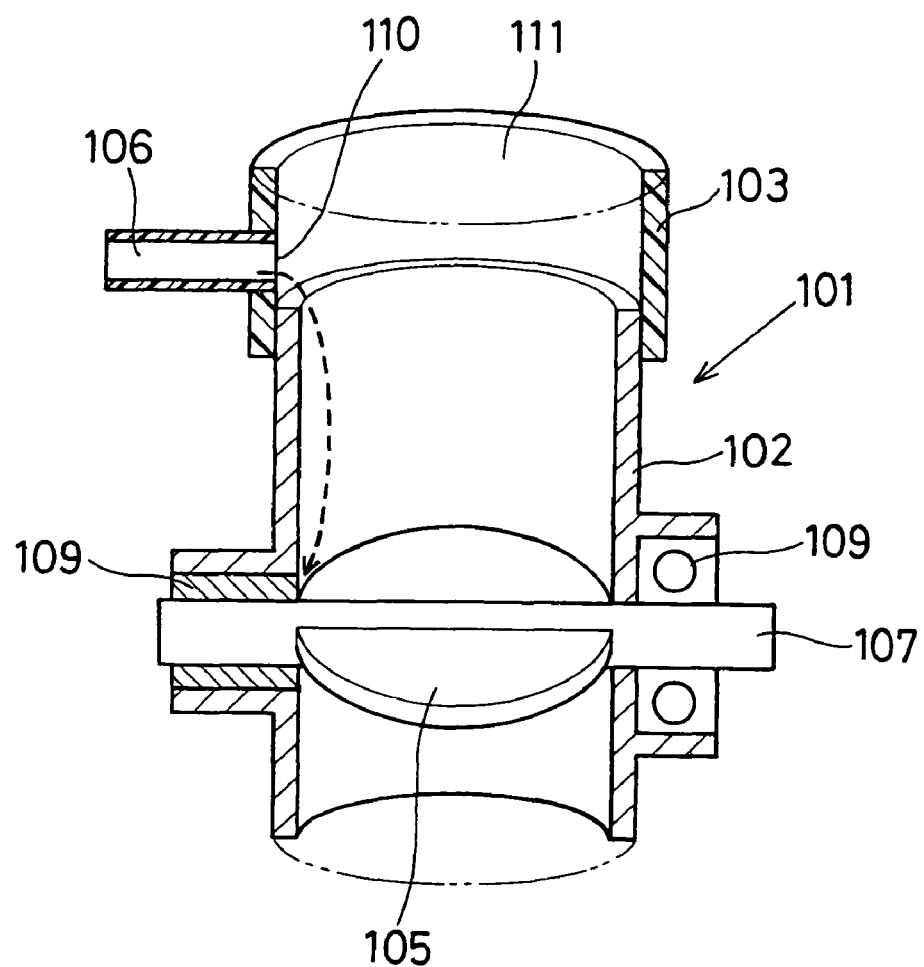
FIG. 19 is a partially sectional view showing the electronic throttle device equipped with the air cleaner hose, according to the related art.
Figure 20A:
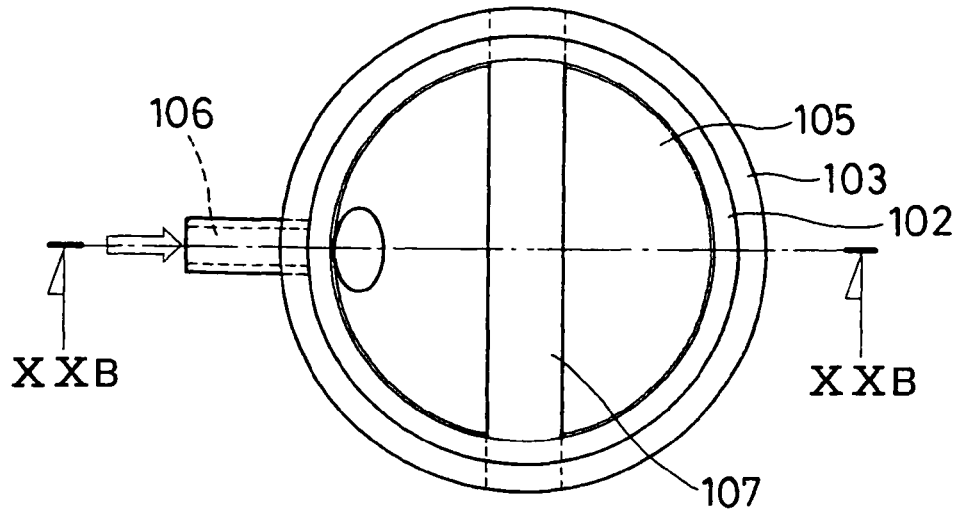
FIG. 20A is a plan view showing the electronic throttle device equipped with the air cleaner hose.
Figure 20B:
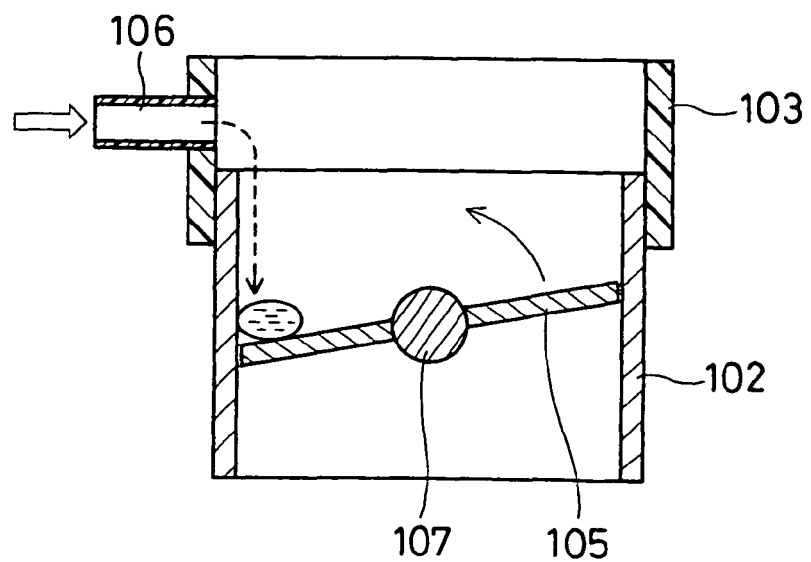
FIG. 20B is a sectional view taken along with the line XXB-XXB in FIG. 20A according to the related art.
Figure 21:
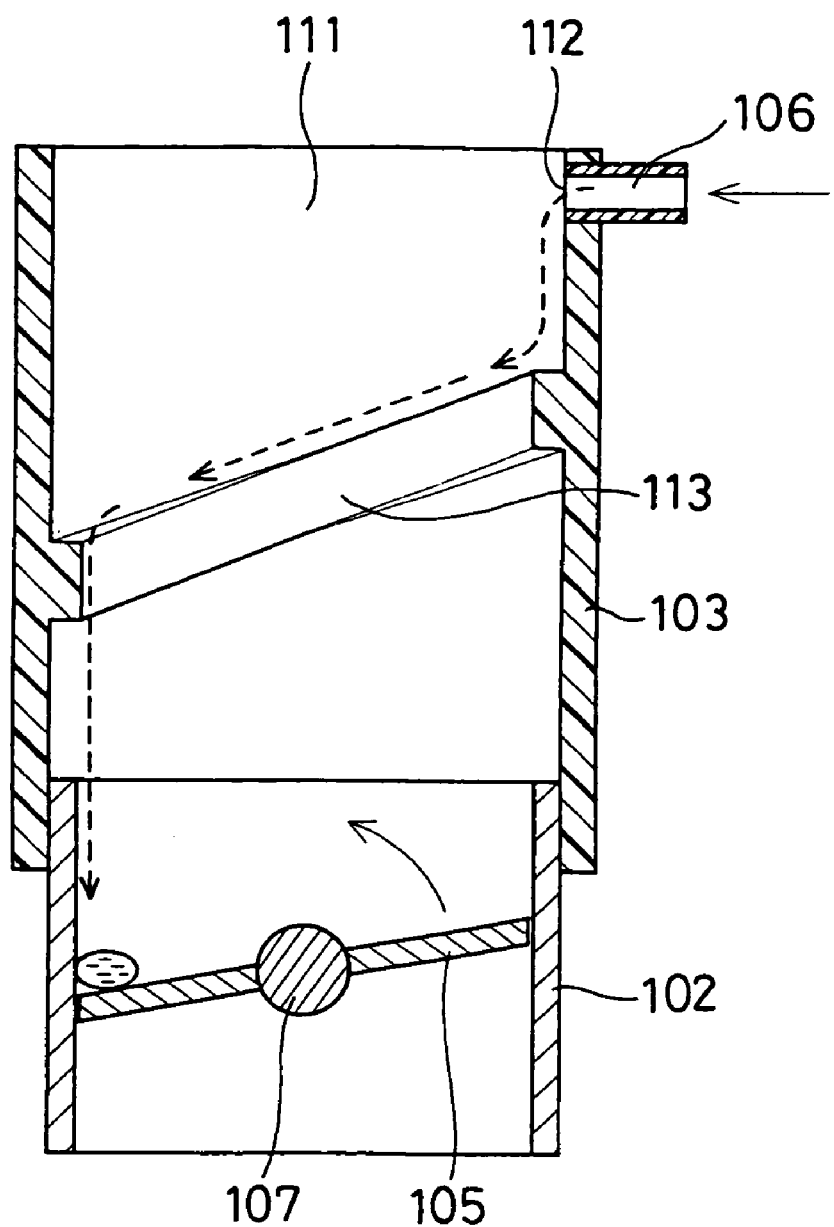
FIG. 21 is a lateral view showing an electronic throttle device equipped with an air cleaner hose, according to a related art.

FIGS. 14A, 148B show a bellows tube portion provided to an air cleaner hose according to the present sixth embodiment. In the electronic throttle device 1 having the downdraft structure according to the present embodiment, the straight pipe portion 35 of the air cleaner hose 7 is airtightly joined with the upper end of the throttle body 2 in the gravity direction. That is, the straight pipe portion 35 of the air cleaner hose 7 is airtightly joined with the upper portion of the throttle body 2 in the vertical direction. In the air cleaner hose 7, the bend portion 33 and the straight pipe portion 35 therebetween have the bellows tube portion (accordion portion) 34 including multiple bellows peak portions 62, for example. In the bellows tube portion 34, each of the multiple bellows peak portions 62 is inclined by a predetermined inclination angle with respect to the horizontal direction of the bellows tube portion 34. Each of the bellows peak portions 62 is inclined with respect to the horizontal direction of the bellows tube portion 34 toward the target location from which condensate is aimed to be dropped. In the present embodiment, the hose wall surface of the bellows tube portion 34 of the air cleaner hose 7 is dented toward the outside of the bellows tube portion 34 so as to define condensate passages (guide recessed portions, guide grooves) 63. Each of the condensate passages 63 is inclined with respect to the horizontal direction of the bellows tube portion 34 toward the target location from which condensate is aimed to be dropped. The bellows peak portions 62, which are inclined, may be applied to the structure of each of the first to fourth embodiment. In the present structure, flow of condensate can be controlled in the bellows tube portion 34 inside the air cleaner hose 7. That is, flow of condensate can be controlled in the intake passage 11 upstream of the throttle valve 3. Therefore, condensate, which drips from the opening 13 of the PCV port 9, the guide groove 14, the condensate drain groove 42, the through hole 43, or the condensate drain hole 59, can be restricted from directly falling onto the bearing 5. In the present structure, the bearing 5 can be protected from direct fall of condensate, and hence the throttle valve 3 and the shaft 4 can be further protected from icing.

Modification

In the above description, the throttle valve 3 according to the above embodiments is employed for controlling intake air supplied to the combustion chamber of the internal combustion engine. Alternatively, the throttle valve 3 according to the above embodiments may be used as an air intake flow control valve configured to generate swirl flow so as to enhance combustion of fuel-air mixture in the combustion chamber of the internal combustion engine. Alternatively, the throttle valve 3 according to the above embodiments may be used for a valve element of an intake passage control mechanism configured to open and close an intake passage of an internal combustion engine.

In the above embodiments, the electromotive actuator, which is provided with the motor and the output power transmission mechanism, is employed as the actuator for actuating the shaft 4 of the throttle valve 3. Alternatively, a negative pressure controlled actuator, which is provided with an electromagnetic negative-pressure regulator valve or an electromotive negative-pressure regulator valve, may be employed as the actuator for actuating the shaft of the throttle valve.

The throttle valve 3 may be operated by mechanically transmitting depression of the accelerator pedal to the shaft 4 of the throttle valve 3 via a wire or the like.

The engine in the above embodiments may be a diesel engine. The engine is not limited to the multi-cylinder engine and may be a single cylinder engine.

In the above embodiments, the guide groove (guide recessed portion) 14, which is dented toward the outside of the air cleaner hose (air hose) 7, is employed as the condensate passage (guide portion). Alternatively, a guide projected portion, which is projected inside the air hose, may be employed as the guide portion.

Each of the opening 13 of the PCV port 9 shown in FIGS. 10A to 10C and the through hole 41, 43 of the membranous member 15, 16 shown in FIGS. 11A, 11B may be applied to the opening (PCV) of the fresh air introduction passage (communication passage) 12 of the union pipe 6.

The above first to sixth embodiments may be arbitrary combined. Specifically, the guide groove (guide recessed portion) 14 in the first embodiment, the direct connection between the bend portion 33 and the straight pipe portion 35 in the second embodiment, the opening 13 and the through hole 41, 43 of the membranous member 15, 16 in the third embodiment, the pocket 17 in the fourth embodiment, the multiple current plates (current rectifying portion) 61 in the fifth embodiment, and the bellows peak portions 62 of the bellows tube portion 34 in the six embodiment may be arbitrarily combined.

Various modifications and alternations may be diversely made to the above embodiments without departing from the spirit of the present invention.

What is claimed is:

1. An air intake apparatus for an internal combustion engine, the air intake apparatus comprising:
    a housing having an intake passage extending substantially in a vertical direction of a vehicle;
    a valve configured to open and close the intake passage;
    a shaft supporting the valve;
    a bearing supporting the shaft;
    a hose connected with an upper side of the housing in the vertical direction and configured to lead intake air into the intake passage; and
    a communication passage configured to communicate an inside of the internal combustion engine with the hose,
    wherein the communication passage has an opening in the vicinity of a first point directly above the bearing,
    the hose has a partition portion,
    the partition portion and a wall surface therebetween define a pocket, which has a condensate passage and a drain hole,
    the condensate passage connects the opening with a target location, from which condensate is to be dropped, and
    the drain hole opens at the target location.

2. The air intake apparatus according to claim 1,
    wherein the partition portion has an opposed portion, which is opposed to the opening and therebetween defines a predetermined gap, and
    the partition portion is defined by a partition plate, which extends from the opposed portion to the target location along the wall surface of the hose.

3. The air intake apparatus according to claim 1, wherein the target location is in the vicinity of a second point directly above a heating unit, which is configured to warm the housing with fluid.

4. The air intake apparatus according to claim 1, wherein the target location is in the vicinity of a third point shifted by 90° from the bearing along a circumferential direction inside the hose.

5. The air intake apparatus according to claim 1,
    wherein the pocket has a lower portion in the gravity direction, and
    the drain hole opens in the lower portion.

6. The air intake apparatus according to claim 1, wherein the wall surface of the hose defines at least one current rectifying portion, which extends substantially in an axial direction of the intake passage.

7. The air intake apparatus according to claim 6, wherein the at least one current rectifying portion includes a plurality of current rectifying portions, which are arranged substantially in parallel at predetermined distances along the wall surface.

8. The air intake apparatus according to claim 1, wherein the hose includes a bellows tube portion having a plurality of bellows peak portions or a plurality of bellows dip portions, which is inclined with respect to a horizontal direction of the bellows tube portion by a predetermined inclination angle.

9. The air intake apparatus according to claim 8, wherein the plurality of bellows peak portions or the plurality of bellows dip portions is inclined toward the target location.

* * * * *